(12) United States Patent
Wiegner et al.

(10) Patent No.: US 12,512,605 B2
(45) Date of Patent: Dec. 30, 2025

(54) APPARATUS COMPRISING A CARRIER

(71) Applicant: NOKIA SOLUTIONS AND NETWORKS OY, Espoo (FI)

(72) Inventors: Dirk Wiegner, Schwaikheim (DE); Wolfgang Templ, Sersheim (DE); Senad Bulja, Dublin (IE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 500 days.

(21) Appl. No.: 18/000,356

(22) PCT Filed: May 20, 2021

(86) PCT No.: PCT/EP2021/063422
§ 371 (c)(1),
(2) Date: Nov. 30, 2022

(87) PCT Pub. No.: WO2021/244857
PCT Pub. Date: Dec. 9, 2021

(65) Prior Publication Data
US 2023/0208026 A1    Jun. 29, 2023

(30) Foreign Application Priority Data
Jun. 1, 2020  (FI) .................. 20205567

(51) Int. Cl.
H01Q 21/22  (2006.01)
H01Q 3/08   (2006.01)
(Continued)

(52) U.S. Cl.
CPC ........... *H01Q 21/22* (2013.01); *H01Q 3/08* (2013.01); *H01Q 3/46* (2013.01); *H01Q 21/065* (2013.01)

(58) Field of Classification Search
CPC ........ H01Q 21/065; H01Q 21/22; H01Q 3/08; H01Q 3/46
See application file for complete search history.

(56) References Cited

U.S. PATENT DOCUMENTS 5,952,980 A    9/1999  Boling
6,512,624 B2 * 1/2003  Tonar .................. G02B 27/01
                                                  359/267
(Continued)

FOREIGN PATENT DOCUMENTS

CN   103178351 B    6/2013
EP   2 887 449 A1   6/2015
(Continued)

OTHER PUBLICATIONS

S. Bulja et al., High Frequency Dielectric Characteristics of Electrochromic, WO3 and NiO Films with LiNbO3 Electrolyte, Scientific Reports, 6:28839, 8 pages (Year: 2016).*
(Continued)

*Primary Examiner* — Robert W Hodge
*Assistant Examiner* — Fred H Mull
(74) *Attorney, Agent, or Firm* — ALSTON & BIRD LLP

(57) ABSTRACT

An apparatus comprising a first carrier and a plurality of electrically conductive elements arranged on the first carrier, wherein the apparatus is configured to selectively activate and/or deactivate at least one of the plurality of electrically conductive elements.

17 Claims, 15 Drawing Sheets

(51) Int. Cl.
  *H01Q 3/46* (2006.01)
  *H01Q 21/06* (2006.01)

(56) References Cited

U.S. PATENT DOCUMENTS

| | | |
|---|---|---|
| 10,187,107 B1 * | 1/2019 | Bulja .................. H10N 70/253 |
| 2003/0160731 A1 | 8/2003 | Wensink |
| 2005/0107125 A1 | 5/2005 | Gilbert |
| 2005/0134953 A1 * | 6/2005 | Mathieu ............... B60Q 1/2665 359/265 |
| 2006/0222101 A1 | 10/2006 | Cetiner et al. |
| 2008/0297194 A1 | 12/2008 | Zeng et al. |
| 2010/0052718 A1 * | 3/2010 | Baker .................... G01R 31/54 324/754.01 |
| 2015/0325897 A1 | 11/2015 | Bulja et al. |
| 2018/0090992 A1 * | 3/2018 | Shrivastava ............ H02J 50/20 |
| 2019/0020100 A1 * | 1/2019 | Jong ...................... H01Q 21/22 |
| 2019/0346730 A1 | 11/2019 | Bulja et al. |
| 2020/0161759 A1 | 5/2020 | Bulja et al. |
| 2021/0075079 A1 | 3/2021 | Wiegner et al. |
| 2021/0124231 A1 | 4/2021 | Wiegner et al. |

FOREIGN PATENT DOCUMENTS

| | | |
|---|---|---|
| EP | 2 916 364 A1 | 9/2015 |
| EP | 2 916 385 A1 | 9/2015 |
| EP | 3 021 419 A1 | 5/2016 |
| EP | 3 399 588 A1 | 11/2018 |
| EP | 3 618 117 A1 | 3/2020 |
| EP | 3 772 773 A1 | 2/2021 |
| FR | 2886225 A1 * | 12/2006 ........... B60N 2/0228 |

OTHER PUBLICATIONS

D. Bansal et al., Low voltage driven RF MEMS capacitive switch using reinforcement for reduced buckling, J. Micromech. Microeng., vol. 27, 6 pages (Year: 2017).*

Permittivity, Merriam Webster Dictionary, https://www.merriam-webster.com/dictionary/permittivity, accessed May 6, 2025 (Year: 2025).*

International Search Report and Written Opinion for Patent Cooperation Treaty Application No. PCT/EP2021/063422 dated Jul. 30, 2021, 12 pages.

Office Action for Finland U.S. Appl. No. 20/205,567 dated Sep. 28, 2020, 10 pages.

* cited by examiner

1000b

1000b

Fig. 6
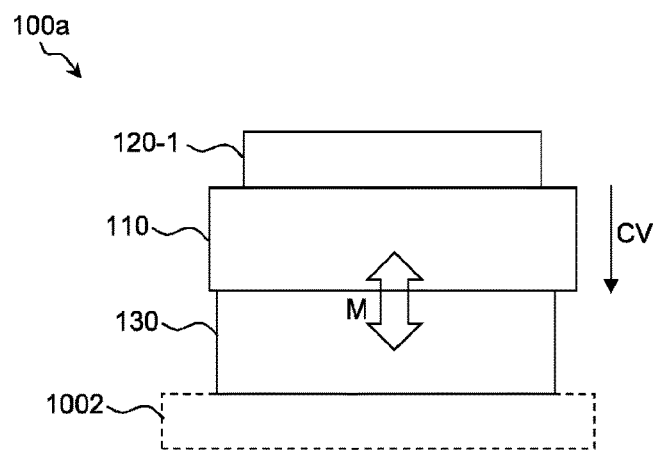
Fig. 7A  Fig. 7B
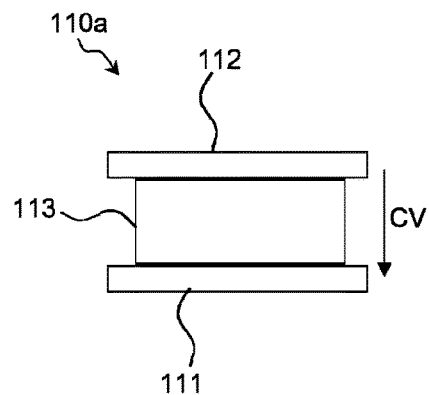 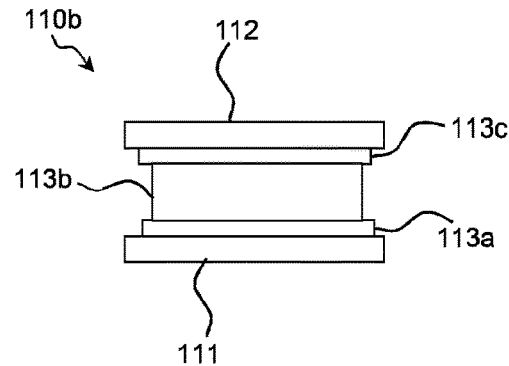
Fig. 8
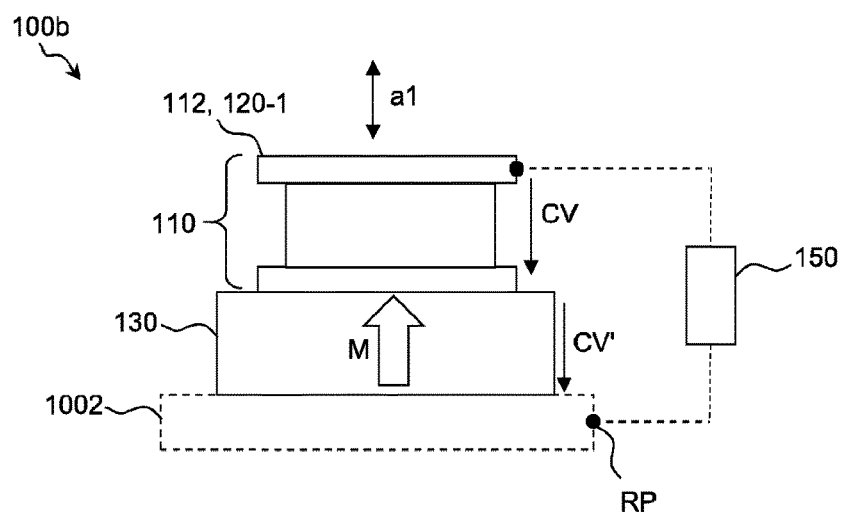

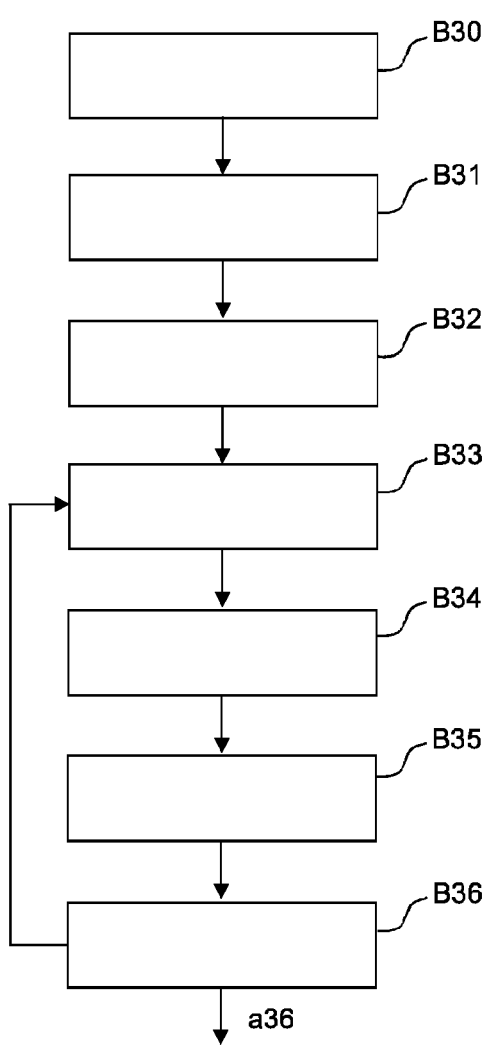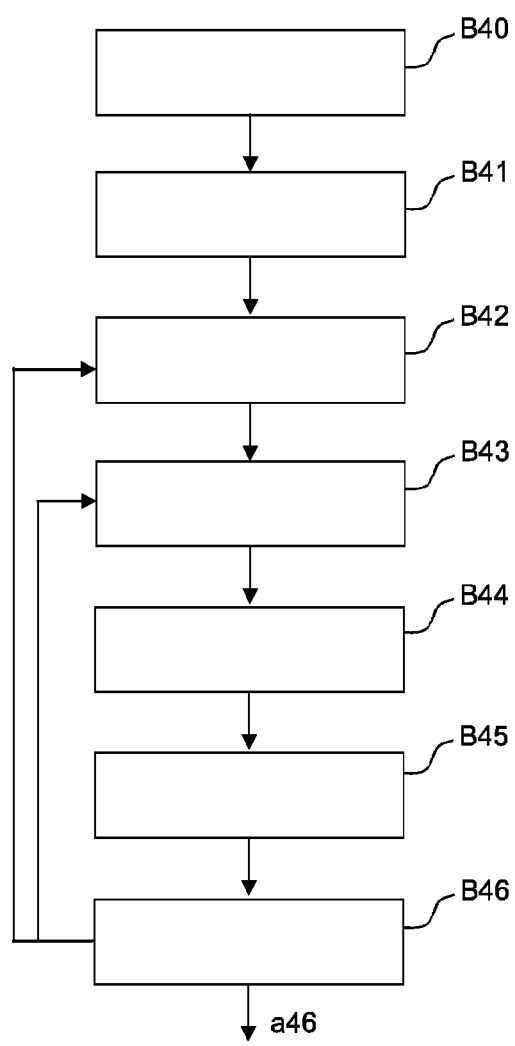

APPARATUS COMPRISING A CARRIER

CROSS-REFERENCE TO RELATED APPLICATIONS

This application is a national phase entry of International Application No. PCT/EP2021/063422, filed May 20, 2021, which claims priority to Finnish Application No. 20205567, filed Jun. 1, 2020, the contents of which are hereby incorporated by reference in their entirety.

FIELD OF THE DISCLOSURE

Exemplary embodiments relate to an apparatus comprising a carrier.

BACKGROUND

RF signals may, for example, be used to wirelessly exchange data between different entities such as different elements of a wireless communications system, for example a network element or base station, and one or more user equipment.

SUMMARY

The scope of protection sought for various embodiments of the invention is set out by the independent claims. The exemplary embodiments and features, if any, described in this specification, that do not fall under the scope of the independent claims, are to be interpreted as examples useful for understanding various exemplary embodiments of the invention.

Exemplary embodiments relate to an apparatus, for example for processing radio frequency, RF, signals, wherein the apparatus comprises a first carrier and a plurality of electrically conductive elements arranged on the first carrier, wherein the apparatus is configured to selectively activate and/or deactivate at least one of the plurality of electrically conductive elements. This for example enables to provide configurable antennas such as for example patch antennas, or RF reflector apparatus, wherein characteristics of the antennas or reflectors may for example be dynamically changed by means of activating or deactivating respective electrically conductive elements.

According to some embodiments, the apparatus comprises at least one impedance element configured to connect the at least one electrically conductive element to an electric reference potential, for example a ground potential, and/or to at least one further one of the plurality of electrically conductive elements. This enables further degrees of freedom.

According to some embodiments, the at least one impedance element may comprise at least one of: a switch, for example semiconductor switch, for example a diode or a transistor, for example field effect transistor (FET), a microelectromechanical switch.

According to further exemplary embodiments, the first carrier may comprise an electrically conductive material and/or surface, and may for example be connected to a reference potential such as for example ground potential. According to further exemplary embodiments, the plurality of electrically conductive elements may for example be arranged on the first carrier in an electrically isolated manner, for example arranged on a dielectric layer provided on the carrier.

According to some embodiments, deactivating electrically conductive elements may comprise connecting the electrically conductive elements to the reference potential such as for example ground potential.

According to some embodiments, activating electrically conductive elements may comprise disconnecting the electrically conductive elements from the reference potential such as for example ground potential, and for example connecting them to a transceiver, which may for example be configured to process radio frequency signals.

According to some embodiments, at least one of the plurality of electrically conductive elements comprises a material that can be switched between an electrically conductive state and a dielectric state, for example, by applying a control signal or control voltage to the material, wherein the apparatus is configured to at least temporarily switch the at least one conductive element to the electrically conductive state or to the dielectric state.

According to some embodiments, deactivating electrically conductive elements may comprise switching the material to the dielectric state.

According to some embodiments, activating electrically conductive elements may comprise switching the electrically conductive elements to the electrically conductive state.

According to some embodiments, the material may comprise or may be a transition metal oxide (TMO).

According to some embodiments, the apparatus is configured to selectively activate a first number of the plurality of electrically conductive elements, for example based on a predetermined pattern.

According to some embodiments, the apparatus further comprises at least one electrochromic element a permittivity of which can be controlled by applying a control voltage to the electrochromic element. As an example, the at least one electrochromic element may be arranged on a surface of the first carrier. According to some embodiments, the electrically conductive element(s) may be arranged on the electrochromic element.

According to some embodiments, the apparatus further comprises at least one actuator configured to drive a movement of at least one of the plurality of electrically conductive elements.

According to some embodiments, the at least one actuator is or comprises at least one electro-active polymer, EAP, actuator. According to some embodiments, other types of actuators such as for example piezoelectric actuators may also be used.

According to some embodiments, the electrochromic element comprises at least a first electrode, a second electrode, and an electrochromic layer arranged between the first electrode and the second electrode, wherein preferably one of the first electrode and the second electrode of the electrochromic element forms at least one of the plurality of electrically conductive elements.

According to some embodiments, a plurality of electrically conductive elements is arranged at the electrochromic element, for example on at least one surface of the electrochromic element.

According to some embodiments, the least one electrochromic element and/or the at least one actuator is arranged on the first carrier.

According to some embodiments, the apparatus comprises a second carrier, wherein the at least one electrochromic element is arranged on the first carrier, and wherein the at least one actuator is arranged between the first carrier and the second carrier.

According to some embodiments, a plurality of actuators is arranged between the first carrier and the second carrier.

According to some embodiments, the plurality of actuators is configured to drive at least one of a) a rotational (or tilting) movement of the first carrier with respect to the second carrier and b) a translational movement of the first carrier with respect to the second carrier.

According to some embodiments, the apparatus further comprises a control unit configured to at least temporarily provide at least one control signal and/or control voltage for at least one of the following elements: a) electrochromic element, b) actuator, c) impedance element, d) switchable electrically conductive element (for example, comprising TMO material).

Some embodiments relate to a method of operating an apparatus for processing radio frequency signals, wherein the apparatus comprises a first carrier and a plurality of electrically conductive elements arranged on the first carrier, wherein the apparatus selectively activates and/or deactivates at least one of the plurality of electrically conductive elements.

According to some embodiments, the apparatus may comprise one or more EC elements, and the method may comprise the apparatus selectively controlling the one or more EC elements, for example by applying a respective control voltage (individually to single EC elements or collectively to at least one group having more than two EC elements).

According to some embodiments, the apparatus may comprise one or more actuators, for example EAP actuators, for example for driving a movement of at least one electrically conductive element, and the method may comprise the apparatus selectively controlling the one or more actuators, for example by applying a respective control voltage (individually to single actuators or collectively to at least one group having more than two actuators).

Some embodiments relate to an antenna system comprising at least one apparatus according to the embodiments. According to some embodiments, at least one of the steps of any of the methods according to the embodiments explained above may be applied to the antenna system and/or to a method of operating such antenna system.

Some embodiments relate to a use of at least one apparatus according to the embodiments and/or of the method according to the embodiments and/or of the antenna system according to the embodiments for at least one of: receiving radio frequency signals, transmitting radio frequency signals, reflecting radio frequency signals, modulating radio frequency signals, modifying a beam characteristic or antenna radiation pattern.

According to further exemplary embodiments, the at least one electrically conductive element may be used to transmit and/or receive and/or reflect (optionally also modulate) radio frequency signals, for example operating as an antenna element and/or reflector and/or modulator element for RF signals, for example for a transmitter device and/or a receiver device for a wireless communications system such as for example a (cellular) communications system.

According to further exemplary embodiments, RF signal processing properties of an assembly comprising inter alia the electrically conductive element(s) may be tuned by applying the control voltage to the EC element, whereby for example a capacitive coupling between the electrically conductive element and for example a reference potential may be influenced.

According to further exemplary embodiments, the EC element may be moved by the actuator, for example EAP actuator, together with the electrically conductive element, wherein the movement may for example comprise a translation and/or a rotation of the EC element with respect to a reference object or surface such as for example an optional carrier the element is arranged on.

According to further exemplary embodiments, the electrochromic element comprises at least a first electrode, a second electrode, and an electrochromic, EC, layer arranged between the first electrode and the second electrode.

According to further exemplary embodiments, the first and/or second electrode may form an electrode layer. As an example, the EC element may comprise a stack of layers, for example two electrode layers with an EC layer arranged therebetween.

According to further exemplary embodiments, the EC layer, too, may comprise a stack of layers ("EC layer stack"), stacked, preferably upon each other, along a first axis, wherein the EC layer stack may comprise at least one of: a) an ion storage layer (for example comprising NiO, nickel oxide), b) an electrolyte layer (for example comprising $LiNbO_3$, lithium niobate), c) an electrochromic, EC, material layer or film (for example comprising $WO_3$, tungsten trioxide).

According to further exemplary embodiments, one of the first electrode and the second electrode of the electrochromic element forms the at least one electrically conductive element, whereby a particularly compact configuration is provided.

According to further exemplary embodiments, a switch may be provided for switching between an RF signal transmission and grounding when the electrically conductive element is "turned off".

According to further exemplary embodiments, a direct current, DC, voltage feed may also be provided to allow an application of an RF signal and/or for example an EC control voltage.

According to further exemplary embodiments, the electrodes for the electrochromic element may be provided separately from the electrically conductive element.

According to further exemplary embodiments, the electrode for the electrochromic element being next or adjacent to the electrically conductive element may be quite thin (for example, sub-skin depth, which means that a thickness of this electrode is smaller than the skin depth of the radio frequency signals).

According to further exemplary embodiments, the electrodes for the electrochromic element and the conductive element may be electrically isolated from each other. According to further exemplary embodiments, the impedance element is configured to connect the at least one electrically conductive element with a controllable impedance to a) an electric reference potential such as for example the ground potential and/or b) at least one further electrically conductive element. This offers even further degrees of freedom for example regarding tuning RF signal processing properties of the apparatus.

According to further exemplary embodiments, a plurality of electrically conductive elements is arranged at the electrochromic element, preferably on a same surface of the EC element.

According to further exemplary embodiments, the impedance element is configured to individually connect at least two of the plurality of electrically conductive elements with a respective controllable impedance to a respective electric reference potential such as for example the ground potential and/or to at least one further electrically conductive element. This way, individual ones of the electrically conductive elements may be grounded and/or connected to each other, which further enables to influence RF signal processing properties of the apparatus.

According to further exemplary embodiments, the impedance element is configured to connect at least two of the plurality of electrically conductive elements with each other via a respective controllable impedance. This way, individual ones of the electrically conductive elements may be connected together, which further enables to influence RF signal processing properties of the apparatus.

According to further exemplary embodiments, the apparatus comprises a second carrier, wherein at least one electrochromic element is arranged on the first carrier, and wherein at least one actuator is arranged between the first carrier and the second carrier. This enables to drive a relative movement of the at least one EC element (and its one or more electrically conductive elements) with respect to the second carrier.

According to further exemplary embodiments, a plurality of actuators, for example EAP actuators, is arranged between the first carrier and the second carrier.

According to further exemplary embodiments, the plurality of (for example, electro-active polymer, EAP) actuators is configured to drive at least one of a) a rotational or tilting movement of the first carrier with respect to the second carrier and b) a translational movement of the first carrier with respect to the second carrier. This way, a spatial orientation and/or position of the first carrier relative to the second carrier may be influenced.

According to further exemplary embodiments, the apparatus further comprises a control unit configured to at least temporarily provide at least one control voltage for at least one of the following elements: a) electrochromic element, b) electro-active polymer, EAP, actuator, c) impedance element, d) electrically conductive element, for example in case of transition metal oxide materials that may be switched between an electrically conductive state and a dielectric state.

According to further exemplary embodiments, the control unit may be configured to at least temporarily provide different, preferably time-varying, control voltage values to at least of the abovementioned elements, whereby a wide variety of tuning measures for an operation of the apparatus is provided.

Further exemplary embodiments relate to a base station, for example for a wireless communications system, comprising at least one apparatus according to the embodiments.

Further exemplary embodiments relate to a mobile/portable electronic device (for example, user equipment), and/or an IoT (Internet of Things) device, and/or a vehicle (car, aircraft, spacecraft, boat/ship, drone, bicycle, motorcycle, and not limited to) comprising at least one apparatus according to the embodiments.

BRIEF DESCRIPTION OF THE FIGURES

Some exemplary embodiments will now be described with reference to the accompanying drawings in which.

DESCRIPTION OF EXEMPLARY EMBODIMENTS

Figure 1:
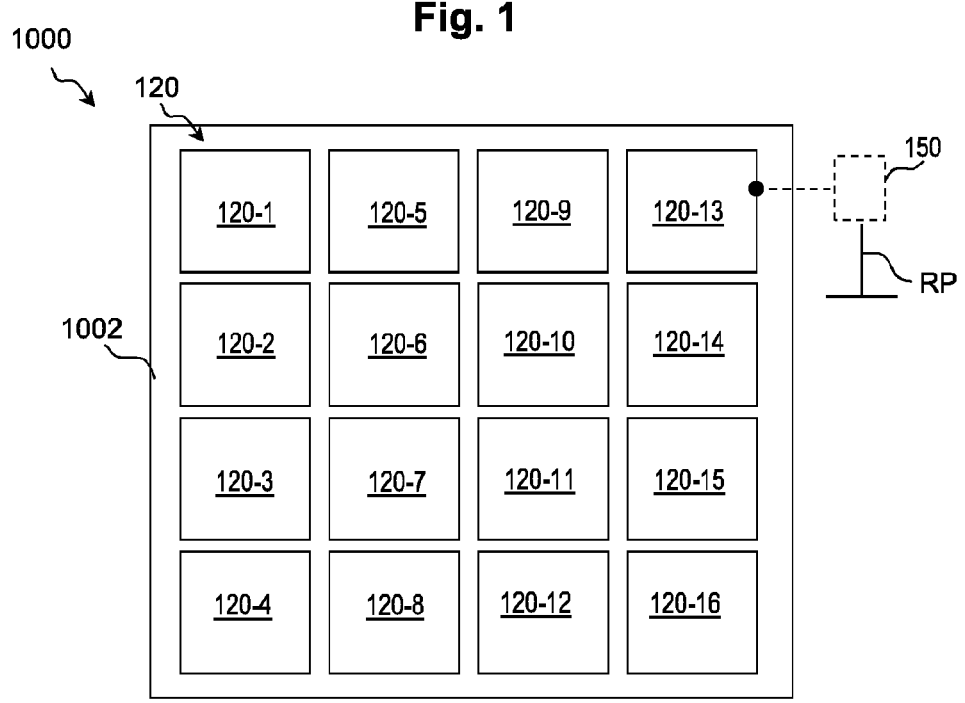
FIG. 1 schematically depicts a simplified block diagram of an apparatus according to exemplary embodiments, FIG. 2A to 2E each schematically depicts a simplified top view of an apparatus according to further exemplary embodiments, FIG. 3A, 3B, 3C, 3D, 3E, 3F, 3G, 3H each schematically depicts a simplified top view of an apparatus according to further exemplary embodiments, FIG. 4 schematically depicts a simplified top view of an apparatus according to further exemplary embodiments, FIG. 5 schematically depicts a simplified side view according to further exemplary embodiments, FIG. 6 schematically depicts a simplified side view according to further exemplary embodiments, FIG. 7A schematically depicts a simplified side view of an electrochromic element according to further exemplary embodiments, FIG. 7B schematically depicts a simplified side view of an electrochromic element according to further exemplary embodiments, FIG. 8 schematically depicts a simplified side view according to further exemplary embodiments, FIG. 9 schematically depicts a simplified top view of an apparatus according to further exemplary embodiments, FIG. 10 schematically depicts a simplified top view of an apparatus according to further exemplary embodiments, FIG. 11A schematically depicts a simplified top view of an apparatus according to further exemplary embodiments, FIG. 11B schematically depicts a simplified side view of the apparatus according to FIG. 11A, FIG. 12 schematically depicts a simplified block diagram of an antenna module according to further exemplary embodiments, FIG. 13 schematically depicts a simplified block diagram according to further exemplary embodiments, FIG. 14 schematically depicts a simplified flow chart according to further exemplary embodiments, FIG. 15A, 15B, 15C, 15D each schematically depicts a simplified flow chart according to further exemplary embodiments, and FIG. 16 schematically depicts a simplified block diagram according to further exemplary embodiments.

FIG. 1 schematically depicts a simplified block diagram of an apparatus 1000 according to exemplary embodiments. The apparatus 1000 may for example be used for processing, for example transmitting and/or reflecting and/or modulating, radio frequency signals. The apparatus 1000 comprises a first carrier 1002 and a plurality 120 of (presently for example sixteen) electrically conductive elements 120-1, 120-2, . . . , 120-16 arranged on the first carrier 1002, wherein the apparatus 1000 is configured to selectively activate and/or deactivate at least one of the plurality 120 of electrically conductive elements. This for example enables to provide configurable antennas such as for example patch antennas, or RF reflector devices, wherein characteristics of the antennas or reflectors may for example be dynamically changed by means of activating or deactivating respective electrically conductive elements 120-1, 120-2, . . . , 120-16.

According to some embodiments, the apparatus 1000 comprises at least one impedance element 150 configured to connect the at least one electrically conductive element 120-1, 120-2, . . . , 120-16 (presently, this is exemplarily indicated in FIG. 1 for the element 120-13) to an electric reference potential RP, for example a ground potential, and/or to at least one further one of the plurality of electrically conductive elements (not shown) and/or to at least one of: a receive circuitry and a transmit circuitry (not shown). This provides further degrees of freedom.

According to some embodiments, the receive circuitry (not shown) may comprise electronic circuitry such as a receiver or a receive chain, which is for example configured to receive an RF signal from an antenna and convert it from an RF range to another frequency ranges such as for example an intermediate frequency, IF, range or a baseband.

According to some embodiments, the transmit circuitry (not shown) may comprise electronic circuitry such as a transmitter or transmit chain, which is capable of processing data and/or voice signals to be transmitted by an antenna.

According to some embodiments, the at least one impedance element 150 may comprise at least one of: a switch, for example semiconductor switch, for example a diode or a transistor, for example field effect transistor (FET), a microelectromechanical switch, a transition metal oxide, TMO, switch.

According to some embodiments, deactivating electrically conductive elements may comprise connecting the electrically conductive elements to the reference potential RP such as for example ground potential.

According to some embodiments, activating electrically conductive elements may comprise disconnecting the electrically conductive elements from the reference potential RP such as for example ground potential.

According to some embodiments, at least one of the plurality 120 of electrically conductive elements comprises a material that can be switched between an electrically conductive state and a dielectric state, for example, by applying a control signal or control voltage to the material, wherein the apparatus is configured to at least temporarily switch the at least one conductive element to the electrically conductive state or to the dielectric state.

According to some embodiments, deactivating electrically conductive elements may comprise switching the material to the dielectric state.

According to some embodiments, activating electrically conductive elements may comprise switching the electrically conductive elements to the electrically conductive state.

According to some embodiments, the material may comprise or may be a transition metal oxide.

According to some embodiments, the apparatus 1000 is configured to selectively activate a first number of the plurality 120 of electrically conductive elements, for example based on a predetermined pattern.

FIG. 2A, 2B, 2C, 2D, 2E each schematically depict a simplified top view of an apparatus 1000a according to further exemplary embodiments. The apparatus 1000a comprises a first carrier 1002 on which 25 electrically conductive elements 120-1, 120-2, . . . , 120-25 are arranged.

By controlling the impedance element 150 (FIG. 1), the electrically conductive elements 120 (FIG. 1) may for example selectively be connected to a reference potential such as the ground potential or disconnected from the reference potential. According to further exemplary embodiments, the connected state may also be considered as an "inactive" state, whereas the disconnected state may be considered as an "active" state, the active state being symbolized in FIG. 2A by a hatching of the respective electrically conductive elements.

Figure 2A:
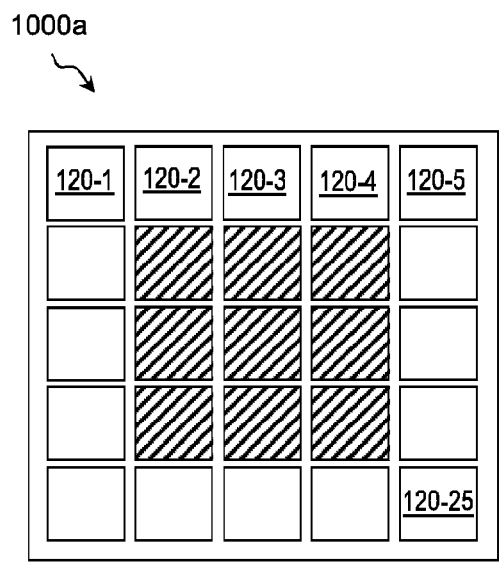
Figure 2B:
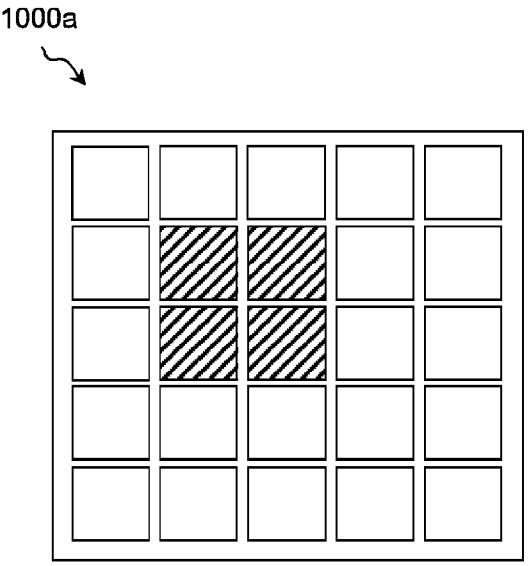
Figure 2C:
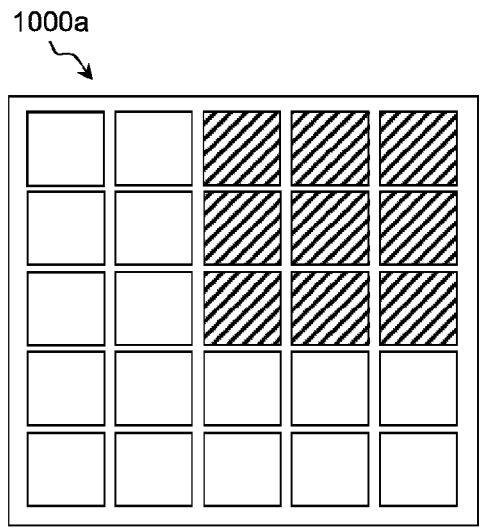
Figure 2D:
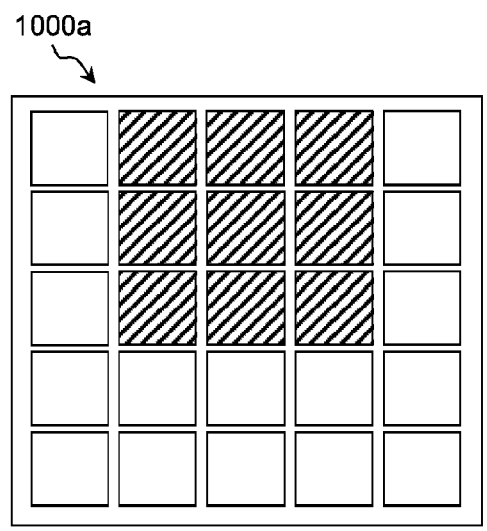
Figure 2E:
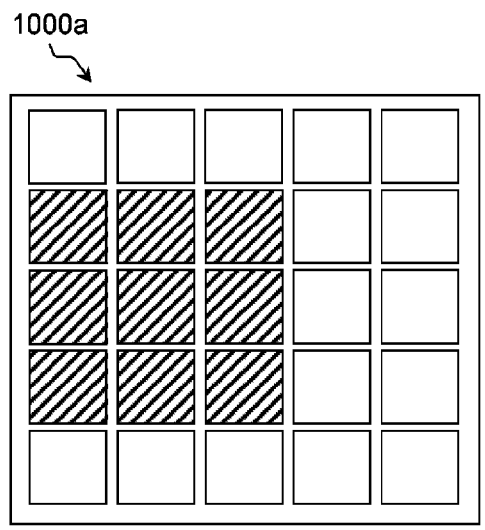

As an example, in FIG. 2A a state of the apparatus 1000a is depicted, wherein nine inner electrically conductive elements are "active" (in other words, not grounded), while the surrounding electrically conductive elements 120-1, 120-2, 120-3, 120-4, 120-5, . . . , 120-25 are inactive. In other words, by controlling the impedance element(s) of the apparatus 1000a, an effective active surface may be dynamically (in other words, during an operation of the apparatus 1000a) defined, which may for example be changed selectively, see for example the further FIGS. 2B, 2C, 2D, 2E.

This way, according to further exemplary embodiments, an overall active for example antenna surface may be controlled, wherein a spatial distribution of active elements may also be controlled by activating respective electrically conductive elements in different regions of the apparatus 1000a, thus effecting a movement or change of spatial distribution of the configured active antenna comprising the activated conductive patches or electrically conductive elements.

FIG. 3A, 3B, 3C, 3D, 3E, 3F, 3G, 3H each schematically depicts a simplified top view of an apparatus 1000b according to further exemplary embodiments. The apparatus 1000b for example comprises a matrix-type arrangement of four by four apparatus of the type referenced as 1000a in FIG. 2A. Similar to FIG. 2, hatched rectangles exemplarily indicate an activated electrically conductive surface. It can be seen from FIG. 3A to 3H, that, according to further exemplary embodiments, numerous different configurations characterizing different activation patterns each can be attained, which may for example be used for controlling a beam characteristic of the apparatus 1000b when using it for example as an antenna (system) for transmitting and/or receiving RF signals.

Figure 3A:
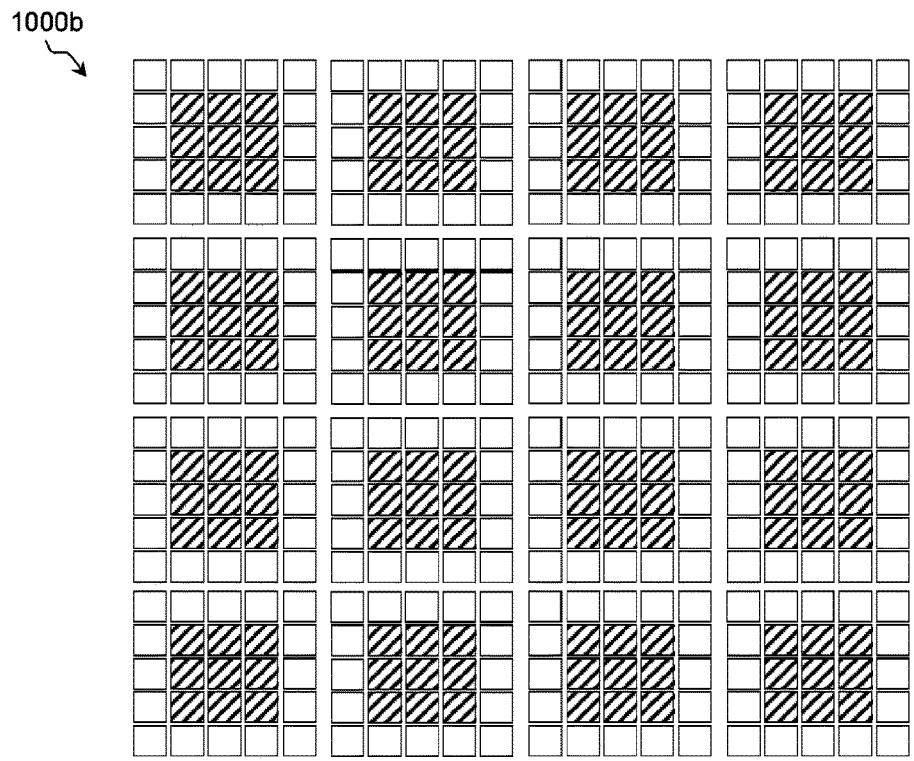
Figure 3B:
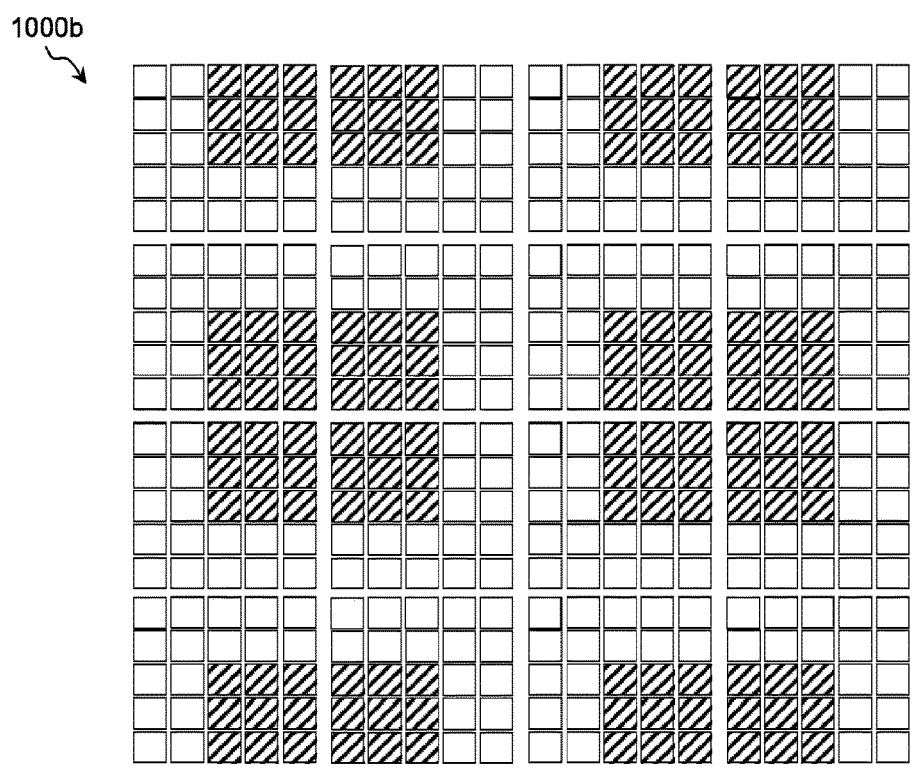
Figure 3C:
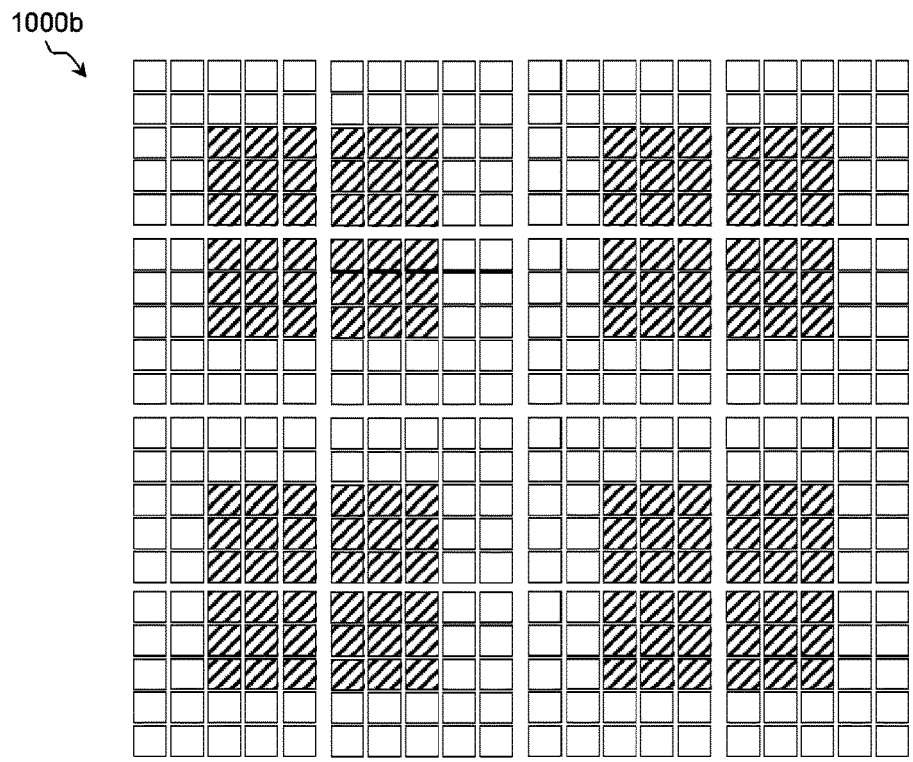
Figure 3D:
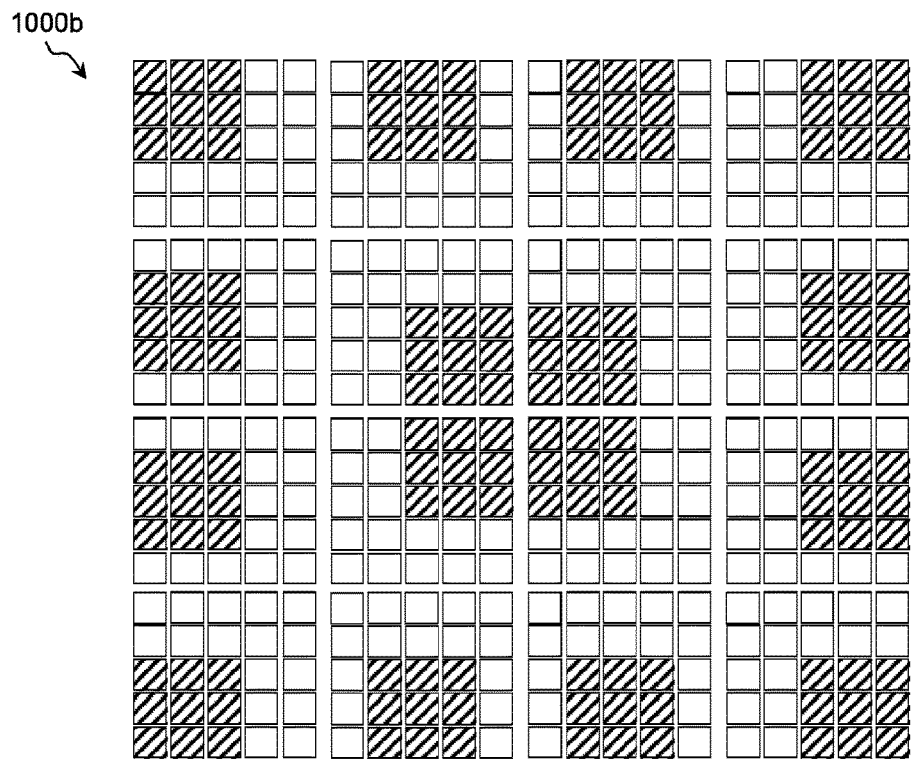
Figure 3E:
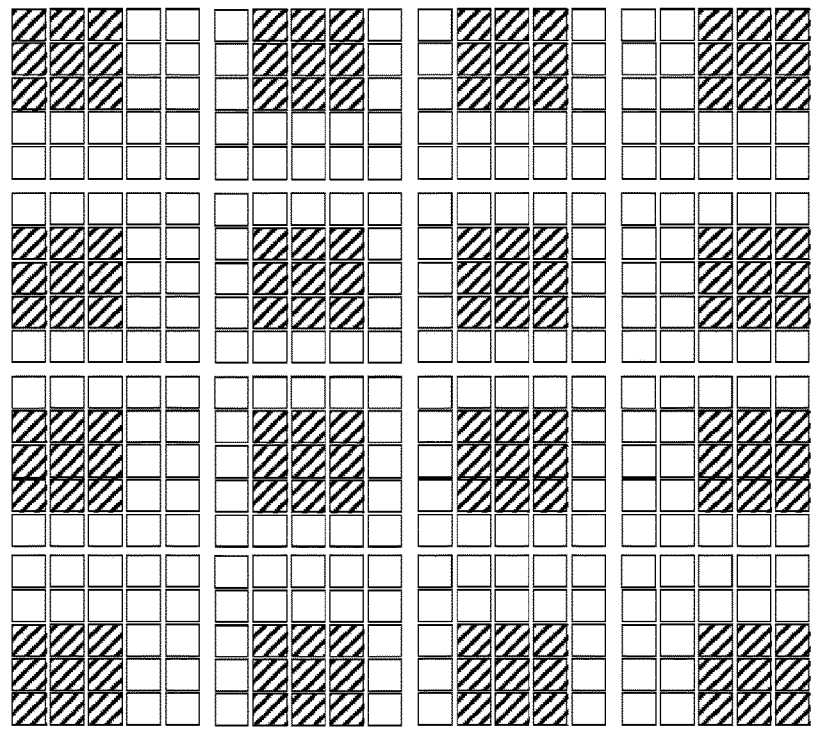
Figure 3F:
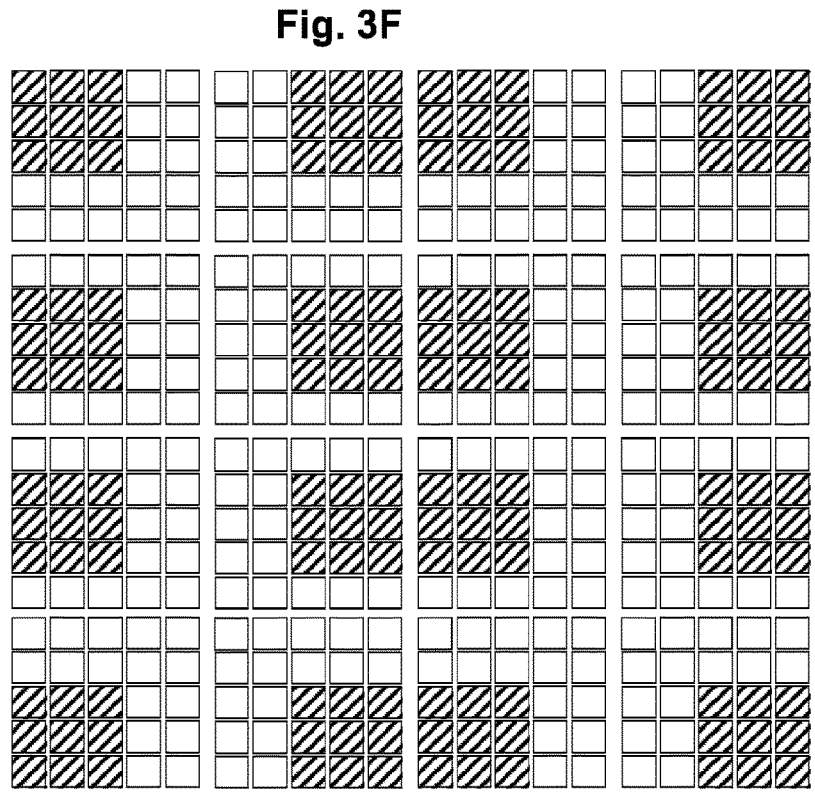
Figure 3G:
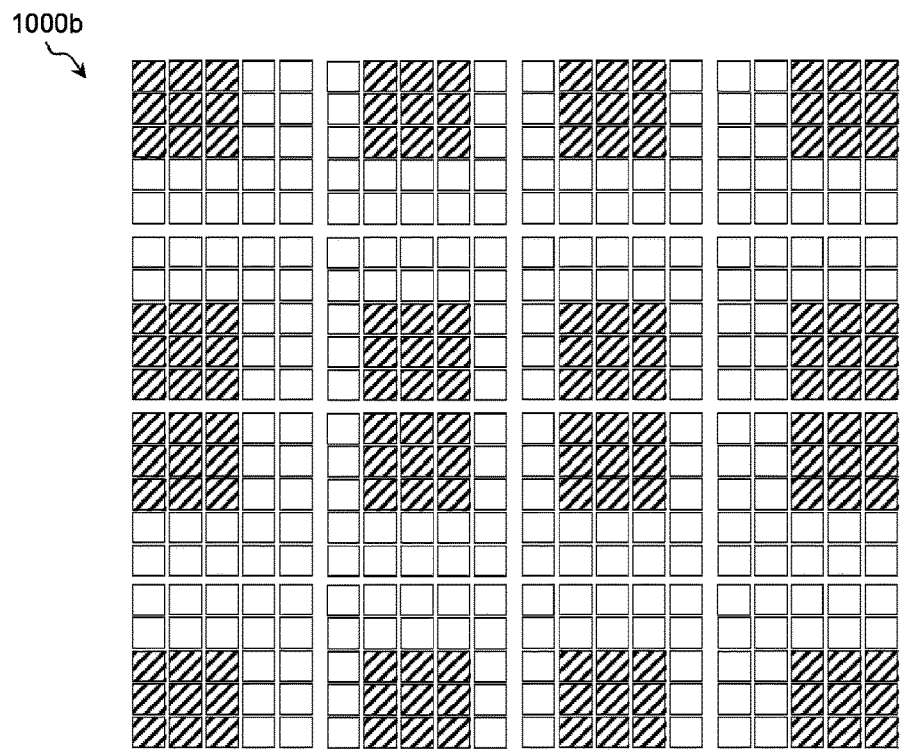
Figure 3H:
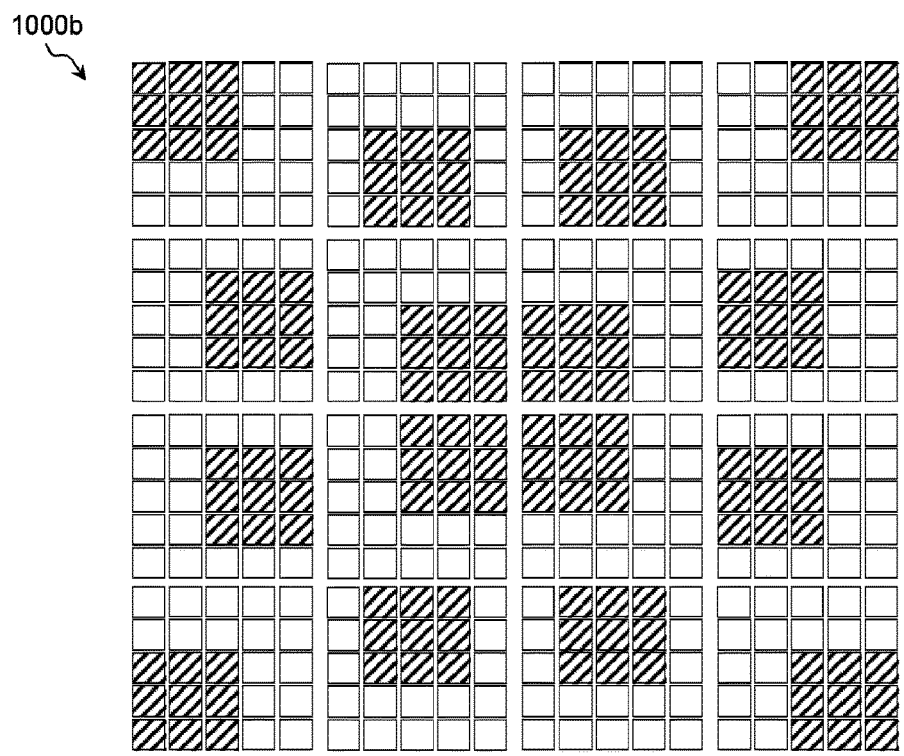

According to further exemplary embodiments, the configurations exemplarily depicted by FIG. 3 may be considered as some examples of theoretically possible antenna patch patterns that may be attained according to some embodiments, wherein for example the pattern of FIG. 3A may represent an initial, substantially uniformly distributed variant, based on which for example the other variants according to FIG. 3B to 3H may be created or configured, respectively, for example by performing the previously described movement of the individual antenna patches of the individual antenna building blocks, in other words based on a selective activation and/or a deactivation of individual ones of the electrically conductive elements 120 of the apparatus 1000b.

According to further exemplary embodiments, and as exemplarily depicted by FIG. 3, all (active) antenna patches of the shown pattern variants may have same size and/or shape. However, according to further exemplary embodiments, different patches of electrically conductive elements having different size(s) and/or shapes may also be provided.

Figure 4:
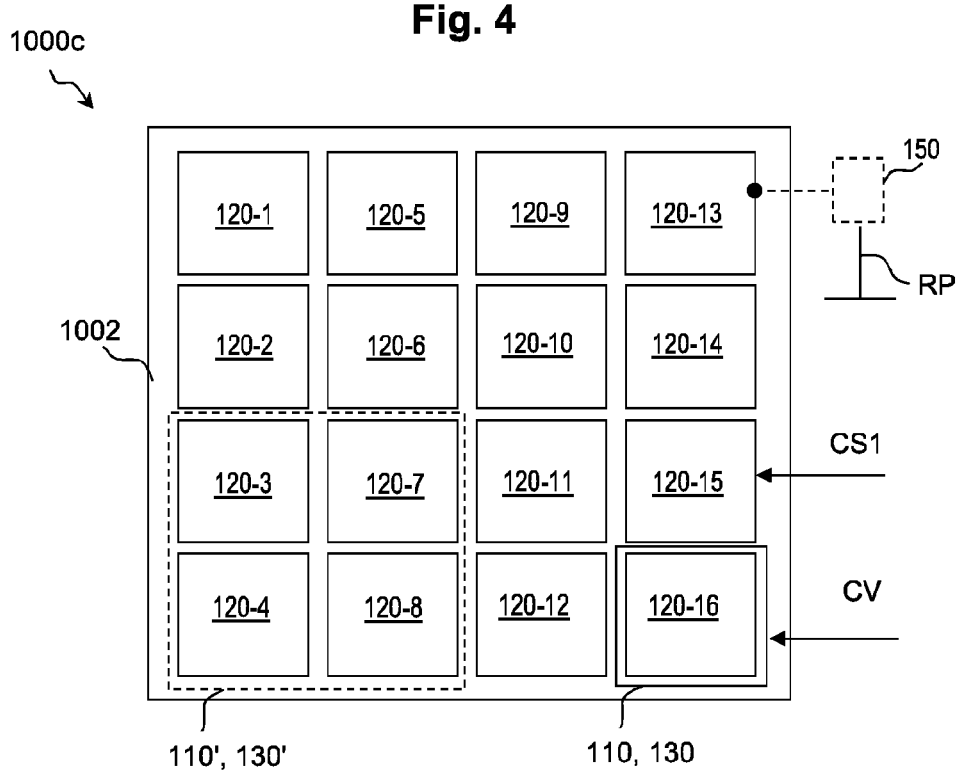

According to some embodiments, see for example FIG. 4, the apparatus 1000c further comprises at least one electrochromic, EC, element 110 a permittivity of which can be controlled by applying a control voltage CV to the electrochromic element 110.

According to some embodiments, the apparatus 1000c further comprises at least one actuator 130 configured to drive a movement of at least one of the plurality 120 of electrically conductive elements. According to the present example of FIG. 4, the at least one actuator 130 is configured to drive a movement of the electrically conductive element 120-16, and/or of its associated Electrochromic element 110.

According to some embodiments, the at least one actuator 130 is or comprises at least one electro-active polymer, EAP, actuator. According to some embodiments, other types of actuators may also be used.

According to some embodiments, more than one electrically conductive element may be assigned a (same) EC element 110' and/or a (same) actuator 130'. This is exemplarily indicated by FIG. 4 by the dashed rectangle 110', 130' which symbolizes an EC element (110') and/or actuator (130') assigned to the four electrically conductive elements 120-3, 120-4, 120-7, 120-8.

Figure 5:
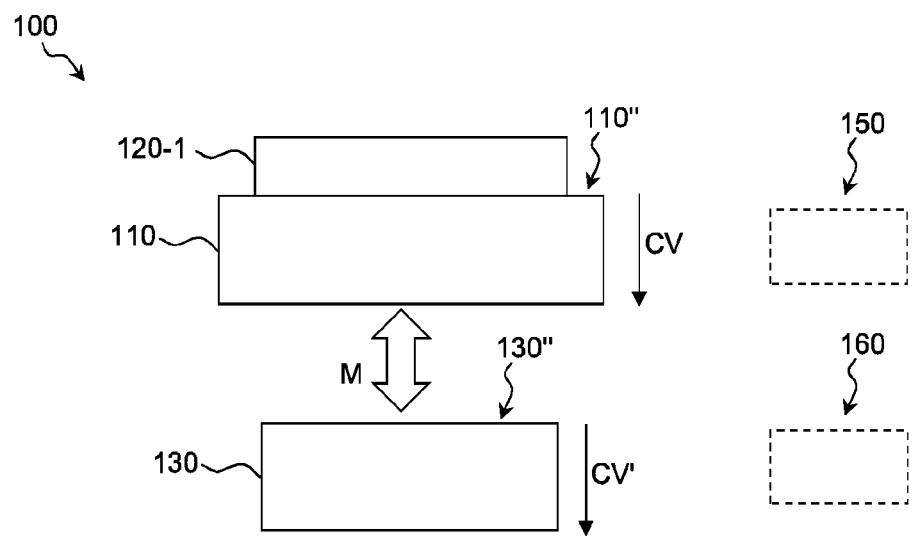

FIG. 5 schematically depicts a side view of a configuration 100 according to some embodiments. The configuration 100 comprises at least one electrically conductive element 120-1, an electrochromic (EC) element 110 a permittivity of which can be controlled by applying a control voltage CV to the electrochromic element 110, and an actuator 130, for example electro-active polymer, EAP, actuator 130 configured to drive a movement M of the electrochromic element 110 and/or of the electrically conductive element 120-1.

According to further exemplary embodiments, the at least one electrically conductive element 120-1 may be arranged on a surface 110" of the EC element 110, as exemplarily depicted by FIG. 5.

According to further exemplary embodiments, several ones of the plurality 120 of electrically conductive elements for example of the apparatus 1000 of FIG. 1 may be arranged on a surface 110" of the EC element 110, as exemplarily depicted by FIG. 5.

According to further exemplary embodiments, the EC element 110 may be arranged on a surface 130" of the EAP actuator 130, as exemplarily depicted by FIG. 5. Optionally, the configuration 100 may be arranged on a carrier or substrate, which is not shown in FIG. 5, for example on the first carrier 1002 of the apparatus 1000 of FIG. 1.

According to further exemplary embodiments, an optional control unit 160 may be provided which may be configured to provide a first control voltage CV to the EC element 110, for example to influence the permittivity of the EC element 110.

According to further exemplary embodiments, the optional control unit 160 may be configured to provide a second control voltage CV' to the EAP actuator 130, for example to drive the movement M of the EC element 110 and/or the at least one electrically conductive element 120-1 arranged on the surface 110' of the EC element 110.

According to further exemplary embodiments, a voltage control of the impedance element 150 may be combined with a voltage control functionality of the control unit 160 (for example, for the electrochromic element(s) and/or the electroactive polymer actuators).

According to further exemplary embodiments, different numbers of control voltages/interfaces are possible, for example if each electrically conductive element has its own impedance element (allowing to individually activate and deactivate), but if some electrically conductive elements are grouped, for example on a common electrochromic and/or electroactive polymer layer.

According to further exemplary embodiments, a number of electrochromic and/or electroactive polymer layer control voltages may be different, if for example electrochromic elements are applied to individual conductive elements, but if electroactive polymer actuators are applied to groups of electrically conductive elements.

According to further exemplary embodiments, the at least one electrically conductive element 120-1 may be used to transmit and/or receive and/or reflect (and/or modulate) radio frequency signals (not shown), for example operating as an antenna element and/or reflector and/or modulator element for RF signals.

According to further embodiments, one or more further electrically conductive elements 120-2, 120-3, . . . of the apparatus 1000 of FIG. 1 may comprise a configuration similar to or identical with the exemplary configuration 100 of FIG. 5.

According to further exemplary embodiments, the RF properties of an assembly 100 comprising inter alia the electrically conductive element 120-1 may be tuned by applying the control voltage CV to the EC element 110, whereby for example a capacitive coupling between the electrically conductive element 120-1 and for example a reference potential (for example characterized by the first carrier 1002, see for example FIG. 1) may be influenced.

According to further exemplary embodiments, the EC element 110 may also be omitted from the configuration 100 of FIG. 5 (and optionally also from other exemplary configurations according to the embodiments explained herein), wherein the at least one electrically conductive element 120-1 is for example arranged on a surface 130' of the actuator 130.

According to further exemplary embodiments, the EC element 110 may be moved by the EAP actuator 130, see for example the block arrow M, together with the electrically conductive element 120-1, wherein the movement M may for example comprise a translation (for example, in a vertical direction of FIG. 5) and/or a rotation (tilting movement) of the EC element 110 with respect to a reference object or surface such as for example the optional carrier 1002 (FIG. 1) the configuration 100 may be arranged on.

In this regard, FIG. 6 schematically depicts a simplified side view of a configuration 100a according to further exemplary embodiments. The configuration 100a of FIG. 6 comprises components 110, 120-1, 130 similar to the configuration 100 of FIG. 5. Additionally, the first carrier 1002 is depicted, wherein the EAP actuator 130 is arranged on the first carrier 1002 so that by applying a control voltage (not shown in FIG. 6) to the EAP actuator 130, a relative movement of the EC element 110 (together with the at least one conductive element 120-1) with respect to the first carrier 1002 may be effected.

According to some embodiments, see for example FIG. 7A, the electrochromic element 110a comprises at least a first electrode 111, a second electrode 112, and an electrochromic layer 113 arranged between the first electrode 111 and the second electrode 112, wherein preferably one of the first electrode 111 and the second electrode 112 of the electrochromic element 110a forms at least one of the plurality 120 of electrically conductive elements 120-1. According to further exemplary embodiments, the control voltage CV may be applied to the electrodes 111, 112.

According to further exemplary embodiments, a switch (not shown) may be provided for switching between an RF signal transmission and grounding when the electrically conductive element is "turned off".

According to further exemplary embodiments, a direct current, DC, voltage feed may also be provided to allow an application of an RF signal and/or for example an EC control voltage.

According to further exemplary embodiments, the electrodes 111, 112 for the electrochromic element 110a may be provided separately from the electrically conductive element 120-1.

According to further exemplary embodiments, the electrode for the electrochromic element being next or adjacent to the electrically conductive element may be quite thin (for example, sub-skin depth, which means that a thickness of this electrode is smaller than the skin depth of the radio frequency signals processed by the apparatus).

According to further exemplary embodiments, the electrodes for the electrochromic element and the conductive element may be electrically isolated from each other.

According to further exemplary embodiments, the first and/or second electrode 111, 112 may form an electrode layer. As an example, the EC element 110a may comprise a stack of layers, for example two electrode layers 111, 112 with an EC layer 113 arranged therebetween.

According to some embodiments, a plurality of electrically conductive elements (not shown in FIG. 7A) is arranged at the electrochromic element 110a, for example on at least one surface of the electrochromic element, wherein at least one of the plurality of electrically conductive elements may form for example the second electrode 112.

According to further exemplary embodiments, see for example the EC element 110b of FIG. 7B, the EC layer 113, too, may comprise a stack of layers ("EC layer stack"), stacked, preferably upon each other, along a first axis, wherein the EC layer stack 113 may comprise at least one of: a) an ion storage layer (for example comprising NiO, nickel oxide) 113a, b) an electrolyte layer (for example comprising $LiNbO_3$, lithium niobate) 113b, c) an electrochromic, EC, material layer or film 113c (for example comprising $WO_3$, tungsten trioxide).

According to further exemplary embodiments, one of the first electrode 111 and the second electrode 112 of the electrochromic element 110, 110a, 110b forms at least one electrically conductive element 120-1 (FIG. 1), whereby a particularly compact configuration is provided.

According to some embodiments, the least one electrochromic element 110a, 110b (FIG. 7A, 7B) is arranged on the first carrier 1002 (FIG. 1).

According to further exemplary embodiments, see for example FIG. 8, a configuration 100b is provided which comprises an impedance element 150 configured to connect the at least one electrically conductive element 120-1 (presently for example formed by the electrode 112), for example with a controllable impedance, to an electric reference potential RP such as for example the ground potential. Presently, for example, the first carrier 1002 comprises an electrically conductive material and/or at least one electrically conductive surface having the reference potential RP. This offers even further degrees of freedom for example regarding tuning RF properties of the configuration 100b.

According to further exemplary embodiments, similar to the impedance element 150 of FIG. 1, the impedance element 150 of FIG. 8 may for example comprise a switch, for example a semiconductor switch. According to further exemplary embodiments, the impedance element 150 comprises a varactor or PIN diode or TMO (transition metal oxide) switch.

Figure 9:
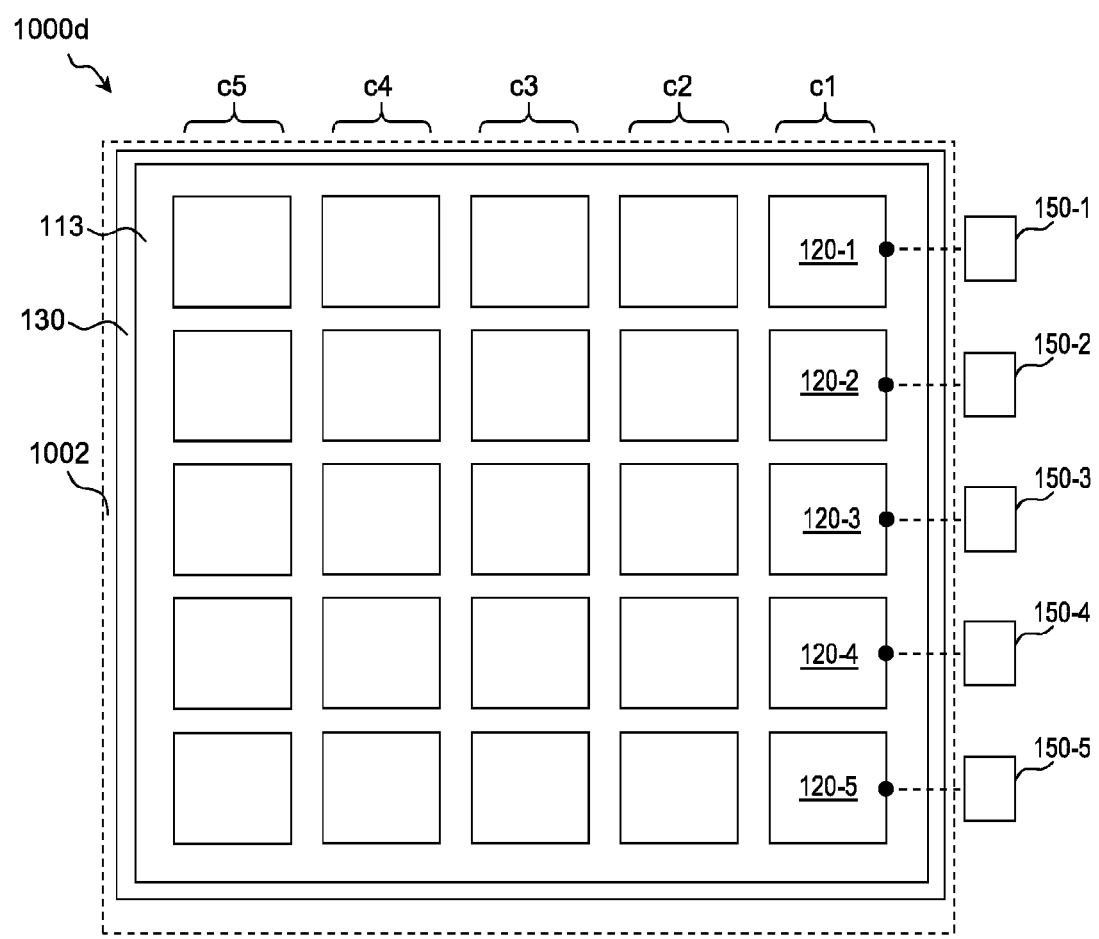

According to further exemplary embodiments, see for example FIG. 9, a plurality of electrically conductive elements is arranged at the electrochromic element, preferably on a same surface of the EC element. In FIG. 9, 25 electrically conductive elements are arranged on the EC layer 113 of the apparatus 1000d, wherein the 25 electrically conductive elements are exemplarily arranged in a matrix-type scheme comprising five "columns" c1, c2, c3, c4, c5 and five rows. Presently, five of the electrically conductive elements are denoted with reference signs 120-1, 120-2, 120-3, 120-4, 120-5 for the sake of intelligibility.

According to further exemplary embodiments, the impedance element 150 (see for example FIG. 1) is configured to individually connect at least two of the plurality of electrically conductive elements 120-1, 120-2, 120-3, 120-4, 120-5 of FIG. 9 with (in other words, by means of) a respective controllable impedance 150-1, 150-2, 150-3, 150-4, 150-5 to a respective electric reference potential RP (FIG. 8) such as for example the ground potential (and/or to each other and/or to at least one of: a receiver circuitry and a transmitter circuitry, not shown). This way, individual ones of the electrically conductive elements 120-1, 120-2, 120-3, 120-4, 120-5 may for example be selectively grounded (and/or connected with other, adjacent and/or non-adjacent electrically conductive elements), which further enables to influence RF signal processing properties of the apparatus 1000d.

As can be seen from FIG. 9, the EC layer 113 of the apparatus 1000d is arranged on a surface of the actuator 130, so that the electrically conductive elements of the apparatus 1000d may for example be collectively moved by the actuator 130, for example in the sense of a translatory motion, for example in a direction perpendicular to the drawing plane of FIG. 9.

According to further exemplary embodiments, the actuator 130 of FIG. 9 may also be omitted.

Figure 10:
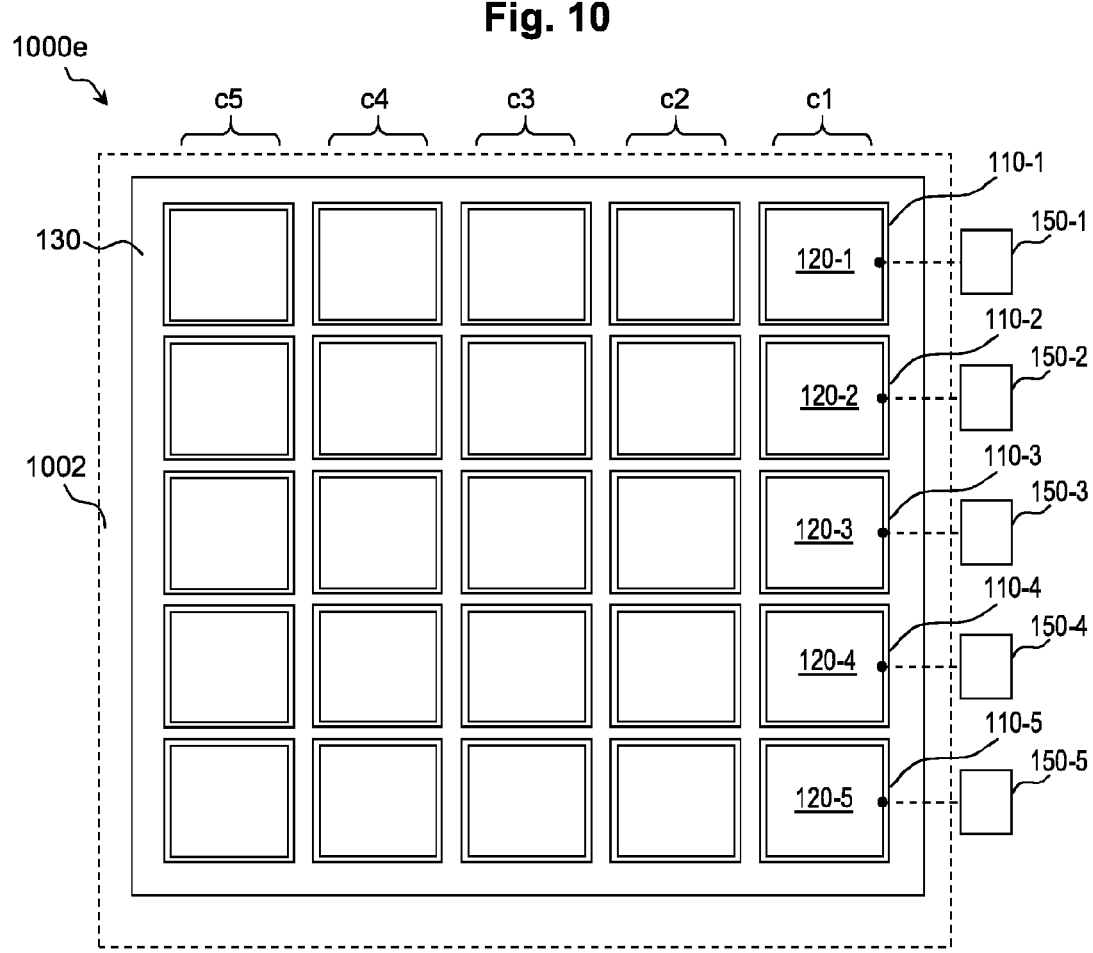

FIG. 10 schematically depicts a simplified top view of an apparatus 1000e according to further exemplary embodiments. Similar to FIG. 9, a first carrier 1002 is provided, and the actuator 130 is arranged on a surface of the first carrier 1002.

According to further exemplary embodiments, the apparatus 1000e of FIG. 10 comprises a plurality of (presently, for example, 25) EC elements five of which are denoted with reference signs 110-1, 110-2, 110-3, 110-4, 110-5 for the sake of intelligibility. Similar to the electrically conductive elements 120-1, 120-2, . . . of FIG. 9, the EC elements 110-1, 110-2, . . . of FIG. 10 are exemplarily arranged in a matrix shape having five columns c1, . . . , c5 and five rows. According to further exemplary embodiments, other numbers and/or arrangements and/or shapes of the electrically conductive elements and/or the EC elements are also possible.

Reference signs 120-1, 120-2, . . . of FIG. 10 denote individual electrically conductive elements of the respective EC elements 110-1, 110-2, . . . .

According to further exemplary embodiments, and similar to FIG. 9, the impedance element 150 (see for example FIG. 1) is configured to individually connect at least two of the plurality of electrically conductive elements 120-1, 120-2, 120-3, 120-4, 120-5 of the apparatus 1000e of FIG. 10 with (in other words, by means of) a respective controllable impedance 150-1, 150-2, 150-3, 150-4, 150-5 to a respective electric reference potential RP (FIG. 1) such as for example the ground potential.

According to further exemplary embodiments, the actuator 130 of FIG. 10 may also be omitted.

Figure 11A:
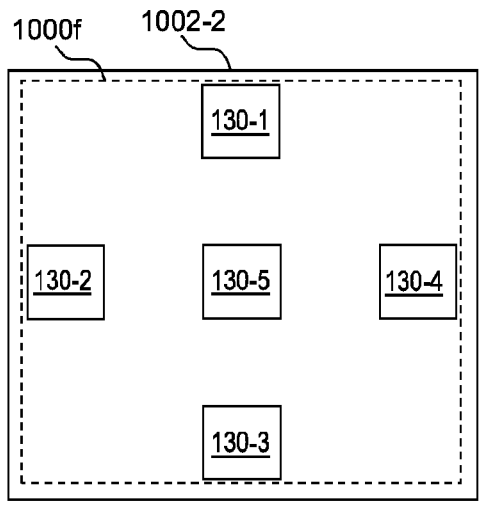
Figure 11B:
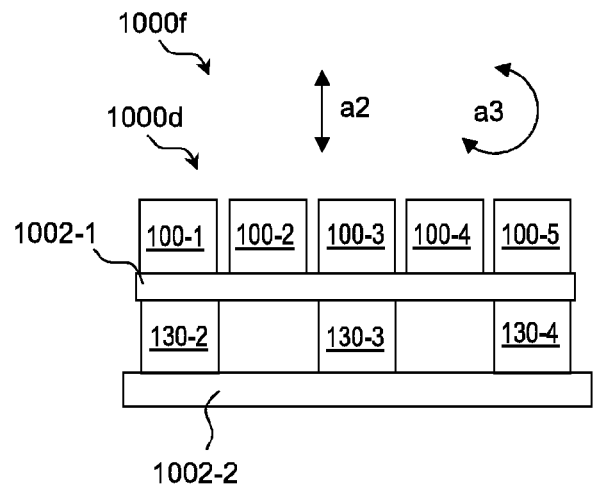

FIG. 11A schematically depicts a simplified top view of an apparatus 1000f according to further exemplary embodiments, and FIG. 11B schematically depicts a simplified side view of the apparatus 1000f. The apparatus 1000f comprises a second carrier 1002-2 on which five EAP actuators 130-1, 130-2, 130-3, 130-4, 130-5 are arranged, and a first carrier 1002-1 carried by the EAP actuators 130-1, 130-2, 130-3, 130-4, 130-5. The first carrier 1002-1 carries a plurality of (presently for example 25) configurations 100-1, . . . , 100-5, . . . , for example similar to configuration 100b of FIG. 8, each of which may for example comprise an EC element 110 and at least one electrically conductive element 120-1 as explained above with respect to FIG. 1. In other words, according to the exemplary configuration of FIG. 11, there are more EC elements 110 (for example, 25) than EAP actuators (for example, 5).

As the EC elements of the apparatus 1000f are exemplarily arranged on the first carrier 1002-1 (FIG. 11B), whereas the electro-active polymer, EAP, actuators 130-1, . . . , 130-5 are arranged between the first carrier 1002-1 and the second carrier 1002-2, the EAP actuators of apparatus 1000f enable to drive a collective relative movement of the EC elements (and the one or more electrically conductive elements, as well as of the first carrier 1002-1) with respect to the second carrier 1002-2.

According to further exemplary embodiments, the plurality of EAP actuators 130-1, . . . , 130-5 is configured to drive at least one of a) a rotational (or tilting) movement a3 of the first carrier 1002-1 with respect to the second carrier 1002-2 and b) a translational movement a2 of the first carrier 1002-1 with respect to the second carrier 1002-2. This way, a spatial orientation and/or position of the first carrier 1002-1 (and its EC elements and electrically conductive elements) relative to the second carrier 1002-2 may be influenced.

As an example, rotational movement with respect to a first axis of rotation substantially characterized by EAP actuators 130-1, 130-3 may be effected by actuating the EAP actuator 130-2 to extend and by actuating the EAP actuator 130-4 to contract (or vice versa), while a state of the further EAP actuators 130-1, 130-3, 130-5 is not changed.

Similarly, as a further example, rotational movement with respect to a second axis of rotation substantially characterized by EAP actuators 130-2, 130-4 may be effected by actuating the EAP actuator 130-1 to extend and by actuating the EAP actuator 130-3 to contract (or vice versa), while a state of the further EAP actuators 130-2, 130-4, 130-5 is not changed.

According to further exemplary embodiments, a translation a2 may for example be effected by simultaneously controlling all five EAP actuators with a same control signal, see for example control voltage CV' (FIG. 5).

According to further exemplary embodiments, the apparatus 1000f further comprises a control unit 160 (see for example FIG. 5) configured to at least temporarily provide at least one control voltage CV, CV' for at least one of the following elements: a) electrochromic element 110, b) electro-active polymer actuator 130, c) impedance element 150, d) electrically conductive element (120-1), for example in case of transition metal oxide materials that may be switched between an electrically conductive state and a dielectric state.

According to further exemplary embodiments, the control unit 160 may be configured to at least temporarily provide different, preferably time-varying, control voltage values to at least one of the abovementioned elements, whereby a wide variety of tuning measures for an operation of the apparatus is provided.

Figure 12:
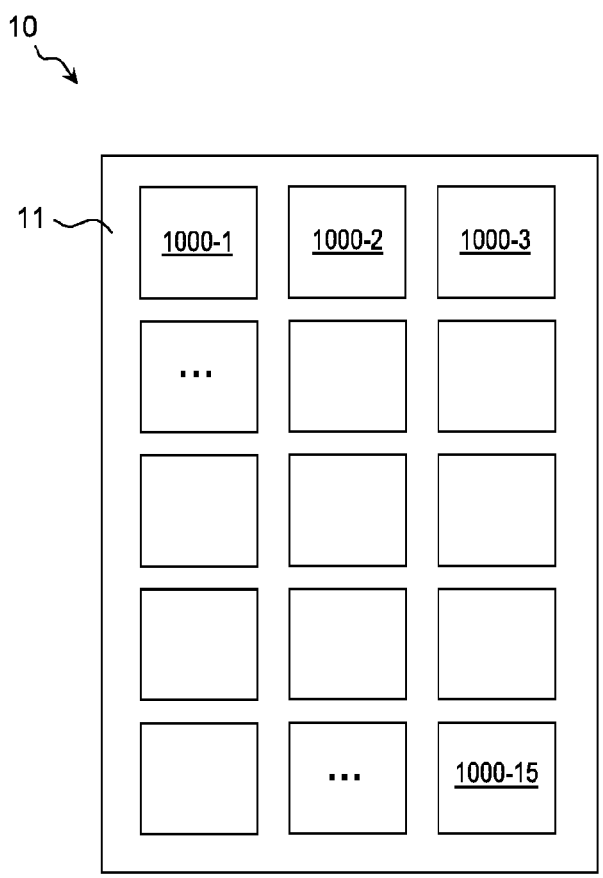

According to further exemplary embodiments, the apparatus according to the embodiments may for example be used to provide, particularly highly flexible, multi-antenna systems 10 (see for example FIG. 12, for example, for massive MIMO (multiple input multiple output) or for beamforming applications), for example allowing to tune RF performance, for example by at least temporarily moving antenna patches (for example formed by the electrically conductive element(s) 120-1, 120-2, . . . ), for example in at least one dimension, preferably all three dimensions (x,y,z), and/or by tilting antennas or antenna elements, even on an individual antenna (in other words, apparatus 100) basis. The antenna system 10 may comprise a plurality of (presently for example 15) apparatus 1000-1, . . . , 1000-15, each of which may for example comprise the exemplary configuration of at least one of the apparatus 1000, 1000a, . . . , 1000f explained above.

By this, according to further exemplary embodiments, scalable and preferably highly flexible RF antenna frontends for example for multi-antenna systems may be provided, for example allowing for tuning of overall multi-antenna system performance, and/or flexible and electrically controllable (see for example the control voltages) adjustment of different antenna radiation patterns, aligned to different and even varying application and user scenarios.

According to further exemplary embodiments, one or more configurations 100, 100a, 100b and/or apparatus 1000, 1000a, . . . according to the embodiments may be used as a building block to achieve a flexible, tunable and controllable apparatus for processing RF signals, for example in the form of an antenna building block, for example supporting movement as explained with reference to FIG. 2, 3.

According to further exemplary embodiments, several configurations 100, 100a, 100b, . . . and/or apparatus 1000, 1000a, . . . , 1000f may be combined to form a multi-antenna system, wherein for example the electrically conductive elements 120-1, 120-2, . . . form individual antenna elements of the multi-antenna system. Such antenna system, see for example FIG. 12, may for example be used for massive MIMO or beamforming or mixed operation, preferably with tunable RF performance (for example, by tuning the EC elements 110 using the first control voltage CV) and electrically controllable antenna radiation patterns (for example, by selective activation using the impedance element(s) 150).

Some embodiments relate to a method of operating an apparatus 1000 (FIG. 1) for processing radio frequency signals, wherein the apparatus 1000 comprises a first carrier 1002 and a plurality 120 of electrically conductive elements arranged on the first carrier 1002, wherein the apparatus 1000 selectively activates and/or deactivates at least one of the plurality of electrically conductive elements. This way, for example different ones of the exemplary patterns depicted by FIG. 2, 3 may be formed.

Some embodiments relate to an antenna system 10 (FIG. 12) comprising at least one apparatus according to the embodiments.

Some embodiments relate to a use of at least one apparatus 1000 according to the embodiments and/or of the method according to the embodiments and/or of the antenna system 10 according to the embodiments for at least one of: receiving radio frequency signals, transmitting radio frequency signals, reflecting radio frequency signals, modulating radio frequency signals, modifying a beam of an antenna radiation pattern or an antenna radiation pattern.

Additionally, according to further exemplary embodiments, EC element-based tuning is enabled (for example, by applying a respective (first) control voltage CV (FIG. 5) to an EC element 110 of the apparatus 1000), and/or actuator driven movement M, for example by applying a respective (second) control voltage CV' (FIG. 5) to a respective actuator 130 of the apparatus 1000. Further exemplary embodiments relate to a method of operating the apparatus according to the embodiments, such as for example a multi-antenna system 10 (FIG. 12).

According to further exemplary embodiments, the method may comprise at least one of the following steps: a) storing and/or re-calling at least one look-up table, for example for alignment of different antenna radiation patterns, b) coordinated determination of antenna weights and/or individual antenna and/or overall antenna configuration control parameters, etc.

According to further exemplary embodiments, channel state information (CSI) measurements may be performed, preferably repeatedly, for example periodically or continuously, in order to adaptively react and/or align the system to changing applications and/or user scenarios. According to further exemplary embodiments, either aligning the antenna configuration/antenna radiation pattern, as previously described, and/or aligning the antenna weights (possibly also in mutual coordination) may be performed. According to further exemplary embodiments, once aligned, the CSI may again be used and/or determined, for example to get new CSI data for the new channel conditions of the aligned system.

Alternatively, or additionally, the CSI measurements may be used as pre-configuration of the system for specific application and user scenarios followed by related determination of antenna weights based on for example CSI information. According to further exemplary embodiments, methods based on artificial intelligence (AI) or machine learning (ML) may for example be used for performing an overall system optimization.

Further exemplary embodiments may for example comprise re-calling antenna configuration data (for example comprising information characterizing whether respective electrically conductive elements or patches are activated or deactivated and/or characterizing one or more states of a control of one or more electrochromic elements and/or characterizing one or more states of a control of one or more electroactive polymer actuators), for example from a look-up table (LUT), for example if a suitable CSI-related stored data set is available.

Figure 13:
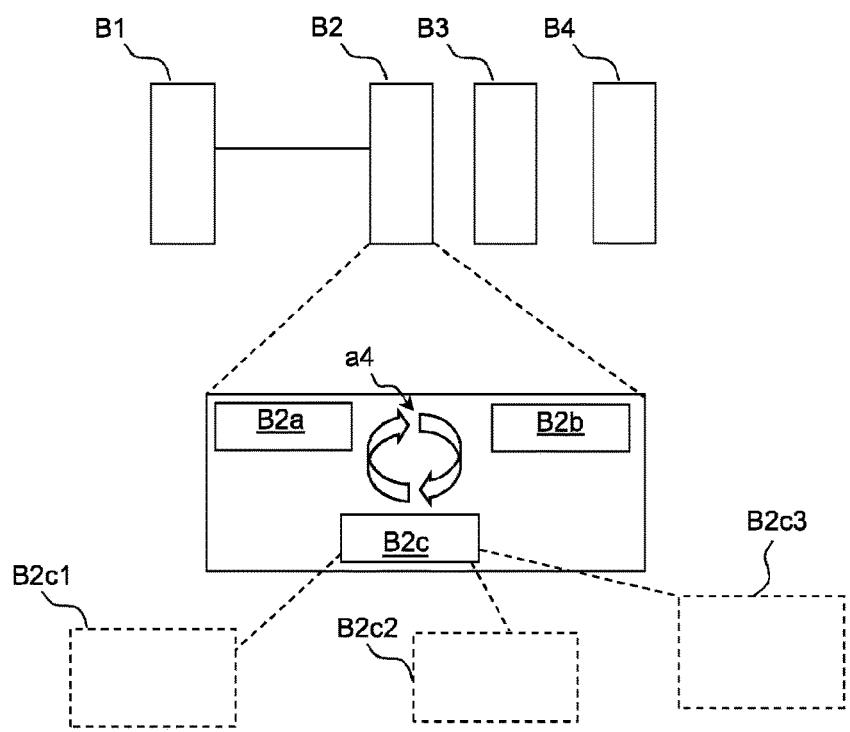

FIG. 13 schematically depicts a simplified block diagram according to further exemplary embodiments. Block B1 represents a baseband unit, block B2 represents a digital front-end section of an RF transceiver, block B3 represents a conversion and amplification section of the RF transceiver, and block B4 represents an antenna system according to the embodiments, see for example system 10 of FIG. 12.

In other words, FIG. 13 may be considered to exemplarily show a placement of an antenna unit or system according to exemplary embodiments in a transceiver context by the aforementioned indication of the global transceiver building blocks: baseband unit B1, digital RF frontend B2, analogue RF conversion and amplification unit B3 as well as the flexible RF antenna unit or system B4.

According to further exemplary embodiments, the antenna system B4 may be connected to the analogue RF conversion and amplification unit B3, for example for exchanging RF system signals with the antenna unit.

According to further exemplary embodiments, the analogue RF frontend B3 as well as the antenna system B4 may be controlled by the digital RF frontend unit B2.

According to further exemplary embodiments, the connection to the baseband unit B1 may for example comprise a CPRI (common public radio interface) and/or alternative solutions (for example wireless, point-to-point, etc., and/or a wired, for example galvanic, connection, for example to any adjacent block).

Block B2$a$ represents an antenna weight calculation functionality, Block B2$b$ represents CSI measurements and/or information related to a user and/or application(s), and Block B2$c$ represents a control unit, for example similar to the control unit 160 of FIG. 5.

Block B2$c$1 represents one or more look up tables (LUT) associated with antenna radiation patterns, block B2$c$2 represents one or more look up tables (LUT) for control of one or more EC elements and/or actuators, for example EAP actuators, of the antenna system 10, and block B2$c$3 represents an exemplary antenna element, for example comprising one or more configurations 100, 100$a$, . . . and/or apparatus 1000, 100$a$, . . . according to the embodiments, wherein at least one of the following aspects of the antenna element B2$c$3 may be controlled by the control unit B2$c$, for example based on the one or more LUTs B2$c$1, B2$c$2: antenna position, antenna element activation, tilting movement and/or translatory movement, RF performance (for example, by controlling the EC element(s) 110). In other words, according to further exemplary embodiments, individual control voltages for at least one EC element and/or at least one actuator and/or at least one impedance element and/or at least one electrically conductive element (for example, if switchable between electrically conductive and dielectric states, respectively, for example based on TMO material) may be determined based on the at least one LUT B2$c$1, B2$c$2. The curved block arrows a4 symbolize an optional use of AI or ML techniques for coordinating and/or optimizing an operation of the antenna system B4, 10. According to further exemplary embodiments, the arrows a4 symbolize a potential mutual coordination between the blocks, for example to achieve improved system operation. Alternatively, according to further exemplary embodiments, at least on of the blocks may also be appropriately controlled and coordinated by a central control instance.

According to further exemplary embodiments, the digital RF front-end unit B2 may be configured to perform at least one of the following techniques of signal processing: pre-distortion, clipping, transceiver control, filtering, antenna weight determination and application.

According to further exemplary embodiments, the digital RF front-end unit B2 may comprise information about channel state (CSI), applications, users, as well as a block for antenna weight calculation and a block for new flexible RF antenna unit control, which itself further may comprise for example look-up-tables of different for example application related antenna patch patterns, EC-material and EA-material control voltages, etc., as well as a block for antenna weight calculation (beamforming, mMIMO (massive MIMO) or mixed), also see for example the exemplary blocks B2$a$, B2$b$, B2$c$ explained above.

According to further exemplary embodiments, at least one of the aforementioned aspects may be used as "set-screw(s)" and/or information, for example to optimize the antenna system B4 and/or the antenna weights, preferably in a mutually coordinated manner, for example to achieve overall improved performance (for example, regarding connectivity, power consumption, number of TRX/antennas to be kept active, system sensitivity, etc.). As also mentioned above, according to further exemplary embodiments, the optimization may for example be done by use of AI and/or ML techniques, see for example the arrows a4.

According to further exemplary embodiments, different embodiments of a multi-antenna system may be provided based on the configurations and/or apparatus according to the embodiments, the multi-antenna system for example comprising the above explained multi-antenna frontend, namely for example fully digital massive MIMO, wherein in this embodiment, each flexible antenna building block may be connected to a (particularly full) transceiver, for example allowing to control each of the individual antenna building blocks with an individual system signal.

According to further exemplary embodiments, alternatively, hybrid massive MIMO configurations may also be provided based on the configurations and/or apparatus according to the embodiments. In some examples, the number of active transceivers and thus independent systems signals which can be processed in parallel may be less than the number of flexible antenna building blocks, for example using splitting (downlink) and combining (uplink), and depending on the chosen embodiment, using analogue or fix phase shifters.

According to further exemplary embodiments, the number of active transceivers may be equal to the number of flexible antenna building blocks or apparatus, which constitutes a particularly flexible and powerful variant.

According to further exemplary embodiments, a power amplifier (not shown) and low noise amplifiers (not shown) may be added to the antenna system block B4, thus reducing output losses (for example, for a downlink) and improving total noise characteristic and sensitivity (for example, for uplink).

According to further exemplary embodiments, electroactive polymer, EAP, material (and/or other suitable material such as for example piezoelectric material) can be used for voltage controlled mechanical extent and contraction, see for example the EAP actuator 130 (FIG. 5), while electrochromic material EC allows for changing the dielectric behaviour of the material and thus for RF tuning, see for example the EC element 110 of FIG. 5. These aspects may advantageously be combined by the apparatus according to some exemplary embodiments.

According to further exemplary embodiments, a size (for example, length or width) of the at least one electrically conductive element 120-1 (FIG. 1) may be a fraction of a wavelength lambda of the RF signals to be processed by the apparatus 1000. As an example, the size of the electrically conductive elements 120-1, 120-2, . . . may be limited to for example 0.25*lambda (particularly in case of single-band application) or to 0.1*lambda (particularly in the case of for example multiband operation, which for example enables to configure the antennas to a larger number of carrier frequencies). As already explained above with reference to FIG. 2, 3, different sizes of active antenna patches (hatched regions) may for example be realized by combining more or less of the indicated 25 basic electrically conductive element, respectively. Regions which are not hatched symbolize deactivated electrically conductive elements. According to further exemplary embodiments, for a given size of the "active" antenna (for example, nine activated electrically conductive elements) and a larger number of total electrically conductive elements (exemplarily chosen 25 electrically conductive elements), a movement of the active antenna patch may be achieved as for example indicated by FIG. 2A, 2C, 2D, 2E. In other words, according to some embodiments, the spatial distribution of activated electrically conductive elements of the apparatus 1000a may be modified, for example by deactivating some electrically conductive elements and by activating some other electrically conductive elements that have previously been deactivated.

According to further exemplary embodiments, if it is for example desired to "move" active antenna patches over extended ranges in one or more spatial directions, for example x- and y-direction, additional apparatus or segments may be provided, thus for example increasing the number of not activated pixels per individual antenna building block or apparatus, see for example the apparatus of FIG. 3.

According to further exemplary embodiments, this may also be done differently for the x- and y-direction (not shown in FIG. 3), allowing for different movement distances in these two directions. According to further exemplary embodiments, individual antenna building blocks such as for example the configuration 100 (FIG. 5) or its at least one electrically conductive element 120-1, respectively, may comprise a shape different from quadratic shape, for example a basically rectangular shape or other shape.

According to further exemplary embodiments, different ones of the electrically conductive elements may comprise a different size.

According to further exemplary embodiments, a plurality of different sized and/or shaped electrically conductive elements may be provided, which according to further exemplary embodiments may be arranged in an ordered or random or pseudo-random manner.

According to further exemplary embodiments, a segment size or size of the at least one electrically conductive element 120-1, for example with respect to wavelength of RF signals to be processed, as well as a number of configurations 100 and/or segments (in other words, electrically conductive elements 120-1, 120-2, . . . ) that may be used for implementing an "active patch", and a number of not activated patches allowing for antenna movement can for example be defined during a system/hardware design phase. Thus, according to further exemplary embodiments, these parameters may be chosen to be most suited to a related application (for example, carrier frequency, number of antennas, desired movement distances).

According to further exemplary embodiments, a combination of individual antenna building blocks, for example apparatus such as for example apparatus 1000d, with different sizes and/or number and/or shape of electrically conductive elements may be combined within a multi-antenna array, for example to cover two carrier frequencies in parallel.

According to further exemplary embodiments, for example to support and/or process different frequency bands by a same apparatus, the activated conductive elements of the apparatus 1000d may be related to a respective carrier frequency to be processed (which may be controlled, for example, by a number of activated electrically conductive elements). Thus, according to further exemplary embodiments, an antenna frontend comprising same sized configurations, for example, of the apparatus 1000d can also support different carrier frequencies and/or frequency bands.

Figure 14:
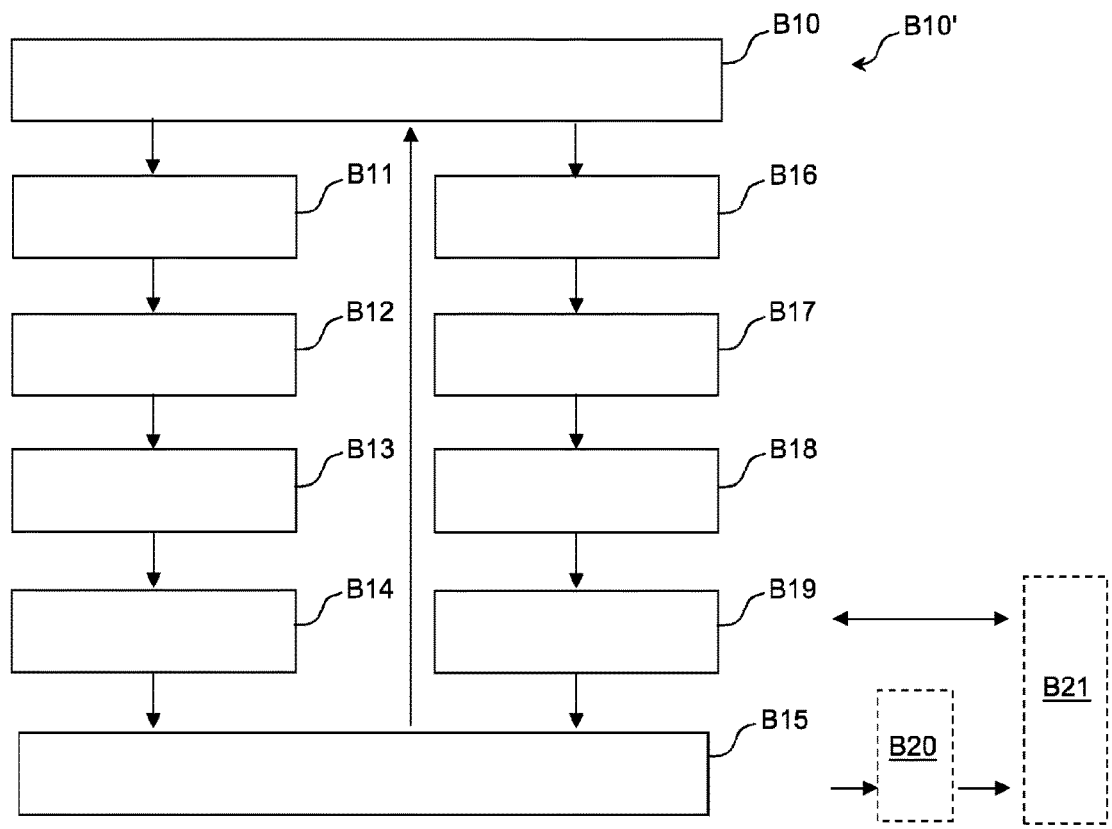

FIG. 14 schematically depicts a simplified flow chart according to further exemplary embodiments characterizing an exemplary method B10' of operation of an antenna system 10 (FIG. 12) according to the embodiments. Block B10 symbolizes an antenna element control, block B11 symbolizes the use of predefined patterns as exemplarily depicted by FIG. 3, block B12 symbolizes a selection of a specific one of the patterns, block B13 symbolizes an application of related stored control voltages, block B14 symbolizes a tuning of control voltages, CV, CV', for example based on a measured CSI, and/or in coordination with applied antenna weights, and block B15 symbolizes monitoring at least one of a user situation and channel state information (CSI), preferably repeatedly, for example periodically or continuously, and an optional step of re-triggering the process, in other words transitioning to block B10, particularly in case of relevant changes of for example at least one component of the antenna system 10, such change(s) for example characterized by at least one of: channel state information, user/load situation, user movements, change of application (for example access>->fronthauling).

According to some embodiments, if for example the user situation and/or channel situation and/or application situation changes, the process may be re-triggered, for example to adapt the system to the new situation.

Block B16 symbolises a flexible antenna radiation pattern configuration, block B17 symbolises measuring a CSI for an actual antenna radiation pattern, block B18 symbolises a determination, based on CSI, for example of and optimal combination of coordinated antenna configuration and antenna weights, optionally employing AI and/or ML techniques, and block B19 symbolises an application of pattern control voltages and/or antenna weights.

Block B20 characterises one or more LUTs, for example associated with antenna radiation patterns, and block B21 characterises at least one antenna element or a control of the antenna element, respectively, for example regarding at least one of the following aspects: antenna position, tilting, height, RF performance, wherein the control may be based on providing at least one individual control voltage to at least one apparatus of the antenna system, for example for influencing EC element(s) and/or (EAP) actuators and/or impedance elements and/or electrically conductive elements (for example, if TMO material is used for switching between the electrically conductive state and the dielectric state).

According to further exemplary embodiments, (multi-) antenna systems 10 based on the configurations and/or apparatus(s) according to the embodiments may at least sometimes provide at least one of the following benefits: Flexibly adjustable (movement and/or size of active patch, adjustable RF properties, controlled activation) active patch antenna patterns can be adjusted and thus optimized to different applications and user scenarios: beam steering, beamforming, massive MIMO operation, mixed beamforming+mMIMO operation, grouping of individual antennas, opening or narrowing the coverage sector, etc. According to further exemplary embodiments, a control of beams is enabled which is not only effected by antenna weights which may be charged to the signals, but for example also by individual EAP-actuator based antenna tilting or EAP-actuator based phase shift (for example, movement in z-direction), or movement of the individual active antenna patches 120 (FIG. 1), for example individually in x- and/or y-direction. Tuning of RF performance (for example frequency band, bandwidth, resonant frequency, frequency band selection, impedance, radiated efficiency, antenna radiation gain, etc.) of individual antenna building block(s), for example by EC-material control CV. Highly reconfigurable active antenna patches (size, position within array), which can be changed flexibly in the field during operation. Quick system adaptation to different application and user scenarios, based on stored and/or and re-called set of LUTs, for example, when put into initial operation, and even further more often appearing conditions can be stored in further LUTs during operation in the field). The LUT(s) may for example be used for different antenna radiation patterns and/or different RF tuning (EAP-material and/or EC-material) conditions, which can be applied either directly for operation or be used as advanced starting points of further system improvement, for example by use of CSI. LUTs of antenna radiation patterns and LUTs of RF tuning voltages can either be used individually or in combination depending on what is beneficial for the actual application and user scenario. Improved (mMIMO, beamforming or mixed) performance (power consumption, connectivity, number of active TRX/antennas, system sensitivity, can be achieved by coordinated mutual optimization and determination of antenna weights, antenna radiation patterns and various RF tuning voltages.

According to further exemplary embodiments, a few LUTs can be stored which may be simply recalled and applied to the system related to known applications and user conditions. In an advanced application according to further exemplary embodiments, for example artificial intelligence can be used to achieve more flexible system self-control using the previously described LUTs and set-screws and even learn about the system's action and re-action, derive how to improve system, to predict application and user scenarios and to predict best suited combination of control parameters to be applied (antenna weights, antenna radiation pattern, EA- and EC-control voltages, . . . ), for example considering operational and environmental boundary conditions.

FIG. 15A, 15B, 15C, 15D each schematically depicts a simplified flow chart according to further exemplary embodiments, related to a potential operation of a flexible antenna movement based multi-antenna system for example considering beamforming and/or massive MIMO operation.

According to some embodiments, the order of the blocks exemplary depicted by FIG. 15 (and by any other flow-chart disclosed herein) may be different. Also, according to some embodiments, one or more blocks may be omitted from the exemplarily depicted flow-charts.

Figure 15C:
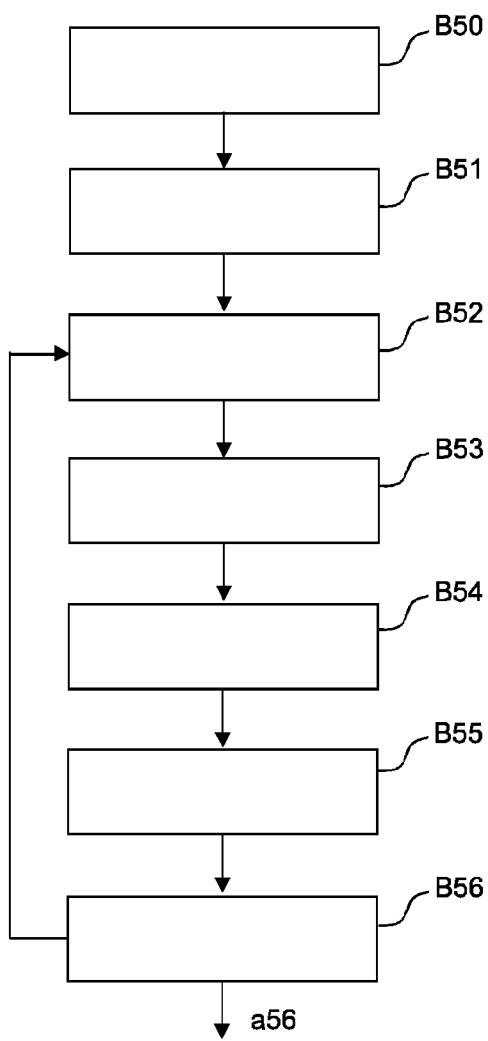
Figure 15D:
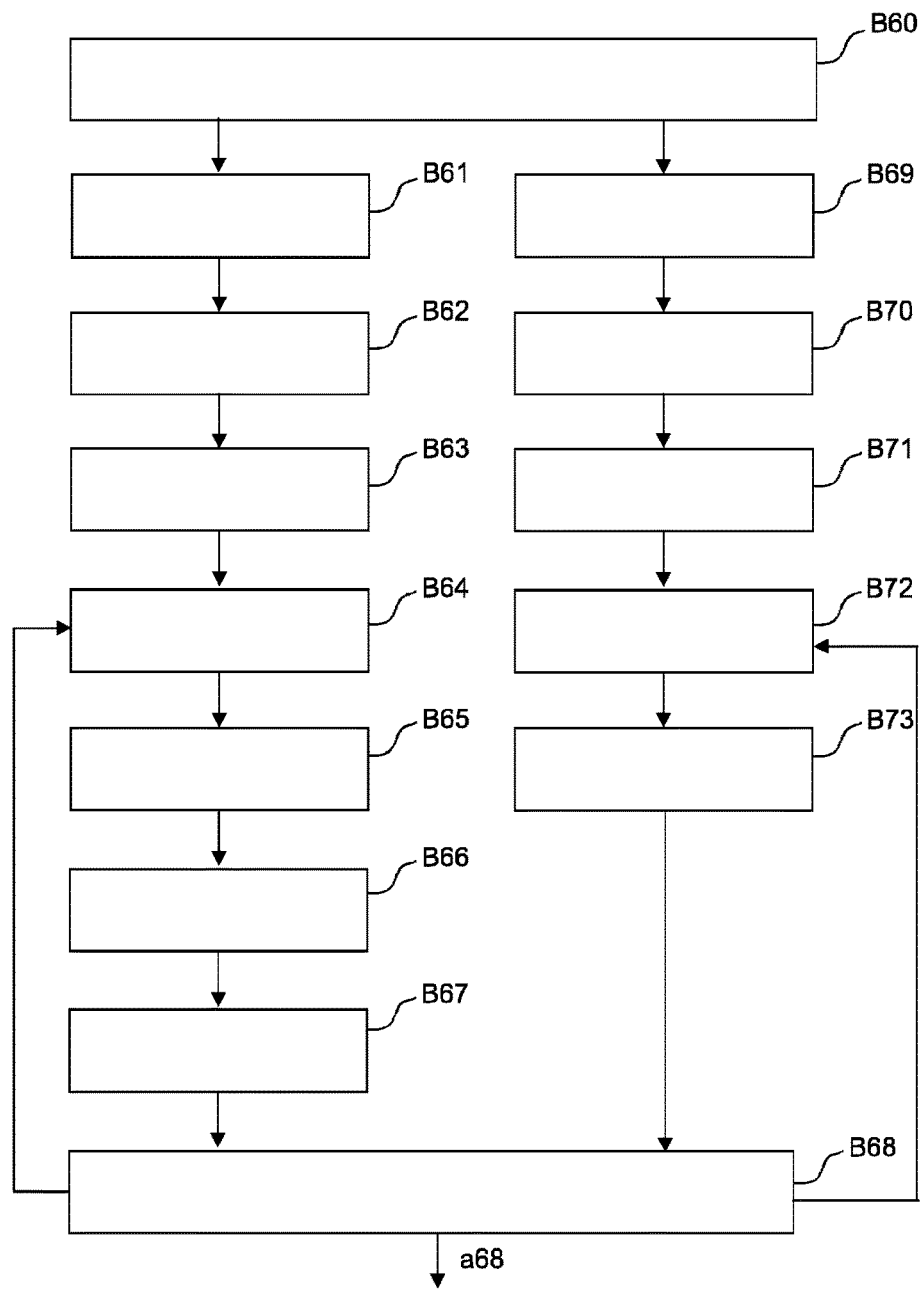

Each of FIG. 15A to 15D exemplarily depicts one operation mode, wherein FIG. 15A relates to a "regular operation mode" (mode 1) (in other words, not providing RF tuning and antenna radiation pattern adjustment (no antenna patch movements), FIG. 15B relates to an "RF antenna tuning mode" (mode 2) (in other words, no antenna radiation pattern adjustment (no antenna patch movements), wherein FIG. 15C relates to a "Pattern mode operation" (mode 3) adjusting antenna radiation pattern but no RF antenna tuning, and FIG. 15D relates to a "fully flexible operation mode" (mode 4) using antenna radiation pattern adjustment and RF antenna tuning.

According to further exemplary embodiments, a mode selection (not shown) of a specific operating mode may be made based on for example a coverage range situation and/or CSI and/or a user situation), or may depend on capabilities of the apparatus or system (for example, variant of the embodiment and/or its complexity).

Referring to FIG. 15A, the first mode, block B30 characterizes a regular operation for example with fixed antenna radiation pattern(s) and no (for example, EC-based) or "only" static RF tuning. Block B31 characterizes the application of the fixed antenna radiation patterns and optionally of static RF antenna tuning voltages, block B32 characterizes a decision whether to perform beamforming, mMIMO, or mixed operation, block B33 characterizes measuring CSI, for example for fixed antenna radiation pattern, block B34 characterizes a determination of antenna weights, block B35 characterizes an application of antenna weights, and block B36 characterizes monitoring a user situation and/or, preferably repeated, for example periodical or continuous, CSI measurements, for example by returning to block B33. If there are relevant changes in the system, another operating mode may be selected staring from block B36, see for example arrow a36.

Referring to FIG. 15B, the second mode, block B40 characterizes an RF tuning mode operation for example with fixed antenna radiation pattern(s) and (for example, EC-based) RF tuning. Block B41 characterizes the application of the fixed antenna radiation patterns and optionally of RF antenna tuning voltages (see for example control voltage CV of FIG. 1), block B42 characterizes measuring CSI for the fixed antenna radiation pattern and start of applying the RF tuning voltage(s) CV, block B43 characterizes a decision whether to perform beamforming, mMIMO, or mixed operation, block B44 characterizes a determination, preferably based on CSI, of an optimal combination of coordinated RF antenna tuning voltages CV and antenna weights, block B45 characterizes an application of the optimal coordinated RF antenna tuning voltages CV and antenna weights, and block B46 characterizes monitoring a user situation and/or, preferably continuous, CSI measurements, and returning to block B43 or B42. If there are relevant changes in the system, another operating mode may be selected staring from block B46, see for example arrow a46.

Referring to FIG. 15C, the third mode, block B50 characterizes a pattern mode operation for example with adjustable antenna radiation pattern(s), but without (for example, EC-based) RF tuning. Block B51 characterizes the application of a starting antenna radiation pattern and optionally fixing selected, static RF antenna tuning voltages (see for example control voltage CV of FIG. 5), block B52 characterizes measuring CSI for the applied antenna radiation pattern, block B53 characterizes a decision whether to perform beamforming, mMIMO, or mixed operation, block B54 characterizes a determination, preferably based on CSI, of an optimal combination of coordinated antenna radiation pattern and antenna weights, block B55 characterizes an application of the optimal coordinated antenna radiation pattern and antenna weights, and block B56 characterizes monitoring a user situation and/or, preferably continuous, CSI measurements, and returning to block B52. If there are relevant changes in the system, another operating mode may be selected starting from block B56, see for example arrow a56.

Referring to FIG. 15D, the fourth mode, block B60 characterizes a "fully flexible" mode of operation for example with adjustable antenna radiation pattern(s) and (for example, EC-based) RF tuning. Block B61 characterizes a predefined antenna radiation pattern, block B62 characterizes identifying and selecting a suitable LUT stored antenna radiation pattern, block B63 characterizes applying the related LUT stored control voltages, block B64 characterizes measuring a CSI, block B65 characterizes a decision whether to perform beamforming, mMIMO, or mixed operation, block B66 characterizes a determination of an optimal combination of coordinated antenna radiation pattern and antenna weights and RF tuning voltages CV, block B67 characterizes an application of updated tuning voltages and antenna radiation patterns and weights, based on the measured CSI, and block B68 characterizes monitoring a user situation and/or, preferably repeated, for example periodical or continuous, CSI measurements, and returning to block B64, for example for keeping the fourth mode. If there are relevant changes in the system, another operating mode may be selected starting from block B68, see for example arrow a68.

Block B69 characterizes a flexible antenna radiation pattern, block B70 characterizes measuring a CSI for the actual antenna radiation pattern and RF tuning voltages, block B71 characterizes a decision whether to perform beamforming, mMIMO, or mixed operation, block B72 characterizes a determination of an optimal combination of coordinated antenna radiation pattern and antenna weights and RF tuning voltages CV, block B73 characterizes an application of updated tuning voltages and antenna radiation patterns and weights, based on the measured CSI, and block B68 characterizes monitoring a user situation and/or, preferably continuous, CSI measurements, as mentioned above, and returning to block B72, for example alternatively to returning to block B64 or to a change of the operating mode.

According to further exemplary embodiments, at least one of the following steps may be performed by using AI and/or ML techniques: B32, B34, B36, B43, B44, B46, B53, B55, B56, B65, B66, B68, B71, B72.

According to further exemplary embodiments, switching between different operation modes (1 to 4, see for example FIG. 15A to 15D) may be performed, for example with different degrees of tuning and antenna radiation pattern adjustment. Selection of a specific mode is for example done based on actual application and user scenario, according to further exemplary embodiments, and, optionally, based on the capabilities of the apparatus or system.

According to further exemplary embodiments, a mutually coordinated determination of antenna weights, tuning voltages and antenna radiation patterns, may be performed, with different degrees of complexity, for example depending on which operation mode is selected, and, optionally, based on the capabilities of the apparatus or system. This allows for example for improved beamforming and/or mMIMO performance.

According to further exemplary embodiments, a control of beams is not only performed by electrical antenna weights and/or moved antenna and/or adjusted antenna radiation pattern, but for example also by individual actuator-based (for example, EAP-material actuator-based) antenna tilting (for example, using the (EAP) actuator(s) 130, see for example FIG. 5) and/or EAP-based phase shift (for example, movement in z-direction).

According to further exemplary embodiments, a selection between pre-defined and LUT-stored different antenna patch patterns (which may also be related to different applications like beamforming, mMIMO and beamforming+mMIMO) may be made, which can be flexibly selected and applied during operation later in the field.

According to further exemplary embodiments, a control and optimization of main functions like operation mode selection, determination of antenna weights, tuning parameter and antenna radiation pattern in mutual coordination, monitoring of user situation and channel situation, etc. may be made, for example by using artificial intelligence, enabling self-optimization.

According to further exemplary embodiments, the principle according to the embodiments may also be applied to for example distributed massive MIMO applications, either with central flexible antenna unit control, or with distributed control of flexible antenna module (part of control in a central unit and further part directly at the digital RF frontends of the individual distributed mMIMO systems) or with full local control of the flexible antenna unit directly at the distributed mMIMO systems without central control, either with mutual coordination channels.

According to further exemplary embodiments, an AI- or ML-based approach may for example resort exemplarily to at least one neural network (NN), preferably artificial NN, aNN, but also to other concepts (for example organic computing approach), for example depending on an individual use case and configuration.

According to further exemplary embodiments, a NN may use either observed overall or individual network performance measures or service quality parameters (or a mix of both) as criteria for running through training sequences in order to setup basic starting configuration parameters for the antenna system stored in lookup tables. According to further exemplary embodiments, these configuration parameters may be used as starting parameters for more dynamic scenarios which for example don't allow for more time consuming NN training.

Further exemplary embodiments relate to storing different starting scenarios for antenna pattern(s) and/or EC/EAP configurations (for example, different values for respective control voltages for electrochromic elements and/or electroactive polymer actuators).

Further exemplary embodiments relate to storing specific patterns (for example antenna radiation patterns and/or patch patterns characterizing electrically conductive elements to be, for example simultaneously, activated) and/or control voltages, for example for repeating situations, which may allow for quick system/antenna adaptation by retrieving and/or using the stored information.

Further exemplary embodiments relate to configuring a system and/or the apparatus with sets of different antenna sizes, for example, addressing different frequency bands, which may for example be operated and/or optimized in parallel, for example enabling parallel multiband operation.

Figure 16:
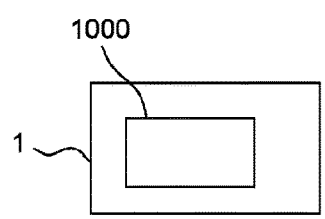

Further exemplary embodiments, see for example FIG. 16, relate to a base station 1, for example for a wireless communications system, comprising at least one apparatus 1000 according to the embodiments.

Further exemplary embodiments relate to a mobile/portable electronic device (not shown, for example, user equipment), and/or an IoT (Internet of Things) device, and/or a vehicle (car, aircraft, spacecraft, boat/ship, drone, bicycle, motorcycle, and not limited to) comprising at least one apparatus according to the embodiments.

The invention claimed is:

1. An apparatus comprising (i) a first carrier, (ii) a plurality of electrically conductive elements arranged on the first carrier, (iii) a second carrier, and (iv) at least one actuator, arranged between the first carrier and the second carrier, and configured to drive a movement of at least one electrically conductive element of the plurality of electrically conductive elements, wherein
    (a) the apparatus is configured to selectively activate or deactivate respective ones of the plurality of electrically conductive elements, and
    (b) the at least one electrically conductive element is configured to at least one of transmit, receive or reflect one or more radio frequency signals in a wireless communication network.

2. The apparatus according to claim 1, comprising at least one impedance element configured to connect the at least one electrically conductive element to an electric reference potential (RP) and/or to a further one of the plurality of electrically conductive elements.

3. The apparatus according to claim 2, wherein the impedance element comprises a switch.

4. The apparatus according to claim 1, wherein at least one of the plurality of electrically conductive elements comprises a material that can be switched between an electrically conductive state and a dielectric state, wherein the apparatus is configured to at least temporarily switch the at least one conductive element to the electrically conductive state or to the dielectric state.

5. The apparatus according to claim 4, wherein the material comprises or is a transition metal oxide.

6. The apparatus according to claim 1, wherein the apparatus is configured to selectively activate a first number of the plurality of electrically conductive elements based on a predetermined pattern.

7. The apparatus according to claim 1, further comprising at least one electrochromic element a permittivity of which can be controlled by applying a control voltage (CV) to the electrochromic element.

8. The apparatus according to claim 7, wherein the electrochromic element comprises at least a first electrode, a second electrode, and an electrochromic layer arranged between the first electrode and the second electrode, wherein one of the first electrode and the second electrode of the electrochromic element forms at least one of the plurality of electrically conductive elements.

9. The apparatus according to claim 7, wherein a plurality of electrically conductive elements is arranged at the electrochromic element.

10. The apparatus according to claim 1, wherein the at least one actuator is or comprises at least one electro-active polymer actuator.

11. The apparatus according to claim 1, wherein a plurality of actuators is arranged between the first carrier and the second carrier.

12. The apparatus according to claim 11, wherein the plurality of actuators is configured to drive at least one of a) a rotational or tilting movement of the first carrier with respect to the second carrier and b) a translational movement of the first carrier with respect to the second carrier.

13. The apparatus according to claim 1, wherein the at least one electrically conductive element is also configured to modulate the one or more radio frequency signals.

14. A base station comprising at least one apparatus according to claim 1.

15. A portable electronic device comprising at least one apparatus according to claim 1.

16. An Internet of Things device comprising at least one apparatus according to claim 1.

17. A vehicle comprising at least one apparatus according to claim 1.

* * * * *